United States Patent
Siskind et al.

(10) Patent No.: US 11,868,771 B2
(45) Date of Patent: *Jan. 9, 2024

(54) SYSTEM AND METHOD FOR DIVIDE-AND-CONQUER CHECKPOINTING

(71) Applicants: Purdue Research Foundation, West Lafayette, IN (US); NATIONAL UNIVERSITY OF IRELAND, MAYNOOTH, Maynooth (IE)

(72) Inventors: Jeffrey Mark Siskind, West Lafayette, IN (US); Barak Avrum Pearlmutter, Dublin (IE)

(73) Assignee: Purdue Research Foundation, West Lafayette, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/818,396

(22) Filed: Aug. 9, 2022

(65) Prior Publication Data

US 2023/0052988 A1 Feb. 16, 2023

Related U.S. Application Data

(63) Continuation of application No. 16/336,094, filed as application No. PCT/US2017/051426 on Sep. 13, 2017, now Pat. No. 11,409,526.

(Continued)

(51) Int. Cl.
*G06F 7/544* (2006.01)
*G06F 17/10* (2006.01)

(Continued)

(52) U.S. Cl.
CPC .......... *G06F 9/30036* (2013.01); *G06F 7/544* (2013.01); *G06F 7/60* (2013.01);

(Continued)

(58) Field of Classification Search
CPC .......... G06F 17/10; G06F 7/544; G06F 9/461
See application file for complete search history.

(56) References Cited

U.S. PATENT DOCUMENTS 11,409,526 B2 *  8/2022  Siskind ................... G06F 17/17
2009/0077543 A1  3/2009  Siskind et al.

(Continued)

OTHER PUBLICATIONS

Siskind et al. "Binomial checkpointing for arbitrary programs with no user annotation." In: arXiv preprint. Apr. 2016 (Apr. 2016) Retrieved from <https://arxiv.org/pdf/1611.03410v1.pdf>, entire document.

(Continued)

*Primary Examiner* — Zachary K Huson
(74) *Attorney, Agent, or Firm* — Maginot, Moore & Beck LLP

(57) ABSTRACT

A system and method which allows the basic checkpoint-reverse-mode AD strategy (of recursively decomposing the computation to reduce storage requirements of reverse-mode AD) to be applied to arbitrary programs: not just programs consisting of loops, but programs with arbitrarily complex control flow. The method comprises (a) transforming the program into a formalism that allows convenient manipulation by formal tools, and (b) introducing a set of operators to allow computations to be decomposed by running them for a given period of time then pausing them, while treating the paused program as a value subject to manipulation.

20 Claims, 24 Drawing Sheets

Related U.S. Application Data

(60) Provisional application No. 62/393,894, filed on Sep. 13, 2016.

(51) Int. Cl.
    *G06F 9/46*        (2006.01)
    *G06F 9/30*        (2018.01)
    *G06F 7/60*        (2006.01)
    *G06F 11/36*      (2006.01)
    *G06N 5/01*       (2023.01)
    *G06F 17/13*      (2006.01)
    *G06F 17/17*      (2006.01)

(52) U.S. Cl.
    CPC .............. *G06F 11/36* (2013.01); *G06F 17/10* (2013.01); *G06F 17/13* (2013.01); *G06F 17/17* (2013.01); *G06N 5/01* (2023.01); *G06F 9/461* (2013.01)

(56) References Cited

U.S. PATENT DOCUMENTS

2011/0288891 A1     11/2011     Tan et al.
2012/0331350 A1     12/2012     Dhoolia et al.

OTHER PUBLICATIONS

Dauvergne et al. "The data-flow equations of checkpointing in reverse automatic differentiation." In: Computational Science—ICCS. 2006 (2006) Retreived from <https://link.springer.com/content/pdf/10.1007/11758549_78.pdf>, entire document.

Griewank et al. "Algorithm 700: revolve: an implentation of checkpointing for the reverse or adjoint mode of computational differentiation." In: ACM Transactions on Mathematical Software (TOMS). Mar. 200 (Mar. 2000) Retreived from <https://pdfs.semantics.scholar.org/766c/d91c0d8650495529cab7d4eeed482729cf89.prf>, entire document.

\* cited by examiner

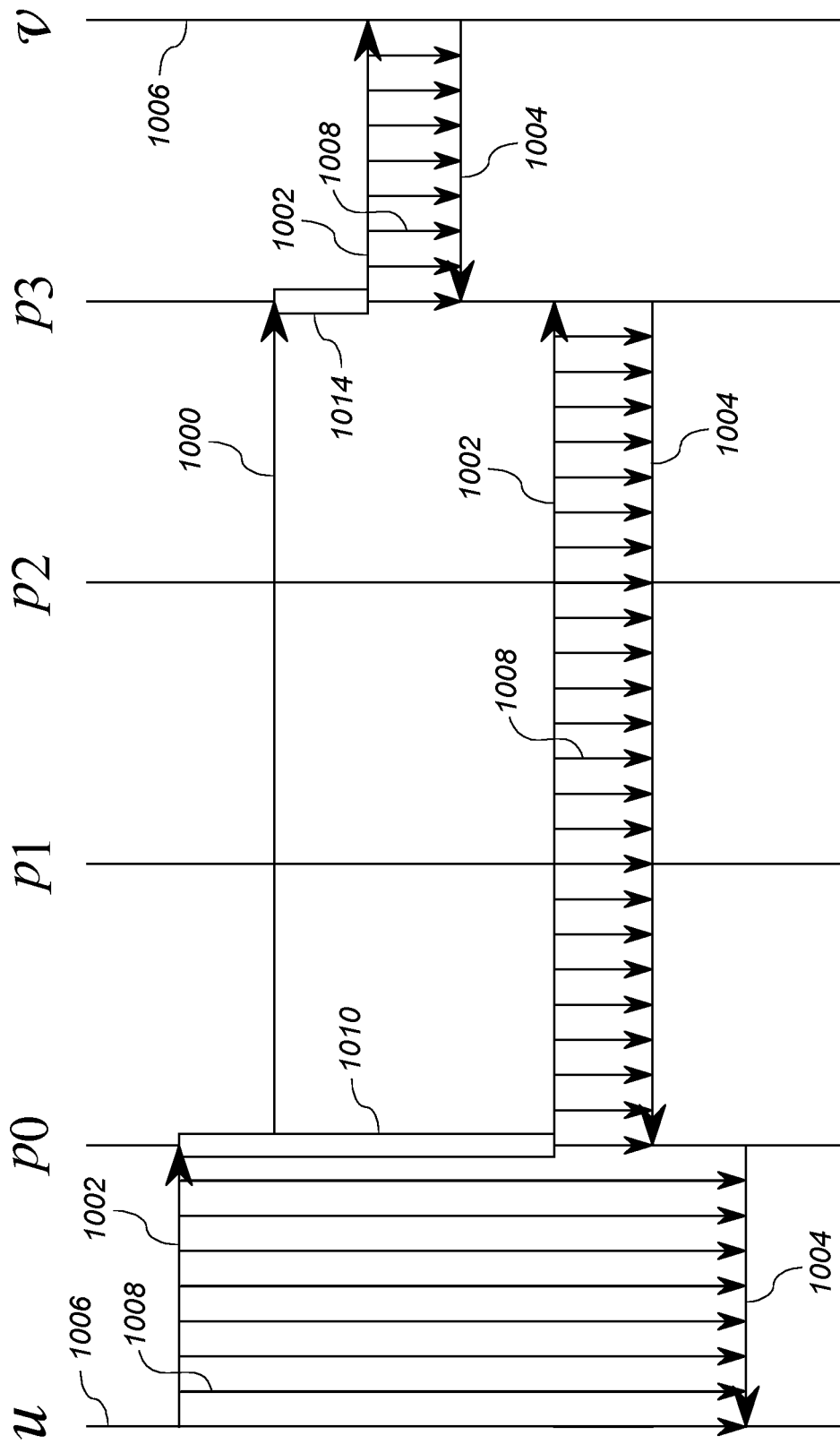

$$A(\langle \lambda x.e, \rho \rangle) v = \mathcal{E} \rho[x \mapsto v] e \quad (2)$$

$$\mathcal{E} \rho c = c \quad (3)$$

$$\mathcal{E} \rho x = \rho x \quad (4)$$

$$\mathcal{E} \rho (\lambda x.e) = \langle (\lambda x.e), \rho \rangle \quad (5)$$

$$\mathcal{E} \rho (e_1 e_2) = A(\mathcal{E} \rho e_1)(\mathcal{E} \rho e_2) \quad (6)$$

$$\mathcal{E} \rho (\text{if } e_1 \text{ then } e_2 \text{ else } e_3) = \text{if}(\mathcal{E} \rho e_1) \text{ then } (\mathcal{E} \rho e_2) \text{ else } (\mathcal{E} \rho e_3) \quad (7)$$

$$\mathcal{E} \rho (\diamond\, e) = \diamond\, (\mathcal{E} \rho e) \quad (8)$$

$$\mathcal{E} \rho (e_1 \bullet e_2) = (\mathcal{E} \rho e_1) \bullet (\mathcal{E} \rho e_2) \quad (9)$$

*FIG. 3*

$$\vec{\mathcal{J}} v_1 v_2 \dot{v}_3 = \text{let } (v_4 \triangleright \dot{v}_5) = (A v_1 (v_2 \triangleright \dot{v}_3)) \text{ in } (v_4, \dot{v}_5) \quad (11)$$

$$\overleftarrow{\mathcal{J}} v_1 v_2 \grave{v}_3 = \text{let } (v_4 \triangleleft \grave{v}_5) = ((A v_1 v_2) \triangleleft \grave{v}_3) \text{ in } (v_4, \grave{v}_5) \quad (12)$$

$$\mathcal{E} \rho (\vec{\mathcal{J}} e_1 e_2 e_3) = \vec{\mathcal{J}} (\mathcal{E} \rho e_1)(\mathcal{E} \rho e_2)(\mathcal{E} \rho e_3) \quad (13)$$

$$\mathcal{E} \rho (\overleftarrow{\mathcal{J}} e_1 e_2 e_3) = \overleftarrow{\mathcal{J}} (\mathcal{E} \rho e_1)(\mathcal{E} \rho e_2)(\mathcal{E} \rho e_3) \quad (14)$$

FIG. 4

To compute $(y, \grave{x}) = \overleftarrow{\mathcal{J}} f x \grave{y}$:
base case ($f x$ fast): $(y, \grave{x}) = \overleftarrow{\mathcal{J}} f x \grave{y}$    (0)
inductive case:    $h \diamond g = f$    (1)
   $z = g x$    (2)
   $(y, \grave{z}) = \overleftarrow{\mathcal{J}} h z \grave{y}$    (3)
   $(z, \grave{x}) = \overleftarrow{\mathcal{J}} g x \grave{z}$    (4)

FIG. 5

PRIMOPS $f\ x \mapsto l$     Return the number $l$ of evaluation steps needed to compute $y = f(x)$.

INTERRUPT $f\ x\ l \mapsto z$     Run the first $l$ steps of the computation of $f(x)$ and return a capsule $z$.

RESUME $z \mapsto y$     If $z = ($INTERRUPT $f\ x\ l)$, return $y = f(x)$.

*FIG. 6*

To compute $(y, \grave{x}) = \overleftarrow{\mathcal{J}} f\ x\ \grave{y}$:     (0)

base case:   $(y, \grave{x}) = \overline{\mathcal{J}} f\ x\ \grave{y}$     (1)

inductive case:   $l = $ PRIMOPS $f\ x$     (2)

$z = $ INTERRUPT $f\ x\ \left[\frac{l}{2}\right]$     (3)

$(y, \grave{z}) = \mathcal{J}(\lambda z.\ $RESUME$z)z\grave{y}$ $(z, \grave{x}) \stackrel{\leftarrow}{=} \mathcal{J}\left(\lambda x.\ \text{INTERRUPT} f\ x\ \left[\frac{l}{2}\right]\right) x \grave{z}$     (4)

*FIG. 7*

$$\mathcal{A}\,k\,n\,l\,\langle(\lambda x.e),\rho\rangle\,v = \mathcal{E}\,k\,n\,l\,\rho[x \mapsto v]\,e \quad (15)$$

$$\mathcal{E}\,k\,l\,l\,\rho\,e = [\![k,\langle(\lambda_e),\rho\rangle]\!] \quad (16)$$

$$\mathcal{E}\,k\,n\,l\,\rho\,c = k\,(n+1)\,l\,c \quad (17)$$

$$\mathcal{E}\,k\,n\,l\,\rho\,x = k\,(n+1)\,l\,(\rho x) \quad (18)$$

$$\mathcal{E}\,k\,n\,l\,\rho\,(\lambda x.e) = k\,(n+1)\,l\,\langle(\lambda x.e),\rho\rangle \quad (19)$$

$$\mathcal{E}\,k\,n\,l\,\rho\,(e_1\,e_2) = \mathcal{E}\,(\lambda n\,l\,v_1.\quad (20)$$
$$\quad \mathcal{E}\,(\lambda n\,l\,v_2.$$
$$\quad\quad (\mathcal{A}\,k\,n\,l\,v_1\,v_2))$$
$$\quad n\,l\,\rho\,e_2))$$
$$(n+1)\,l\,\rho\,e_1$$

$$\mathcal{E}\,k\,n\,l\,\rho\,(\text{if}\,e_1\,\text{then}\,e_2\,\text{else}\,e_3) = \mathcal{E}\,(\lambda n\,l\,v_1.\quad (21)$$
$$\quad (\text{if}\,v_1$$
$$\quad \text{then}(\mathcal{E}\,k\,n\,l\,\rho\,e_2)$$
$$\quad \text{else}(\mathcal{E}\,k\,n\,l\,\rho\,e_3)))$$
$$(n+1)\,l\,\rho\,e_1$$

$$\mathcal{E}\,k\,l\,n\,\rho\,(\diamond e) = \mathcal{E}\,(\lambda n\,l\,v.\quad (22)$$
$$\quad (k\,n\,l\,(\diamond v)))$$
$$(n+1)\,l\,\rho\,e$$

$$\mathcal{E}\,k\,n\,l\,\rho\,(e_1 * e_2) = \mathcal{E}\,(\lambda n\,l\,v_1.\quad (23)$$
$$\quad (\mathcal{E}\,(\lambda n\,l\,v_2.$$
$$\quad\quad (k\,n\,l\,(v_1 * v_2)))$$
$$\quad n\,l\,\rho\,e_2))$$
$$(n+1)\,l\,\rho\,e_1$$

FIG. 8

$$\vec{\mathcal{J}} v_1 v_2 \acute{v}_3 = A(\lambda n \, l \, (v_4 \triangleright \acute{v}_5)) \quad (24)$$
$$(v_4, \acute{v}_5))$$
$$0 \infty v_1 (v_2 \triangleright \acute{v}_2)$$

$$\vec{\mathcal{J}} v_1 v_2 \grave{v}_3 = A(\lambda n \, l \, v \quad (25)$$
$$\text{let } (v_4 \triangleleft \grave{v}_5) = v \triangleleft \grave{v}_3$$
$$\text{in } (v_4, \grave{v}_5)))$$
$$0 \infty v_1 v_2$$

$$\mathcal{E} \, k \, n \, l \, \rho \, (\vec{\mathcal{J}} e_1 e_2 e_3) = \mathcal{E} \, (\lambda n \, l \, v_1. \quad (26)$$
$$(\mathcal{E} \, (\lambda n \, l \, v_2.$$
$$(\mathcal{E} \, (\lambda n \, l \, v_3.$$
$$(k \, n \, l \, (\vec{\mathcal{J}} \, v_1 \, v_2 \, v_3)))$$
$$n \, l \, \rho \, e_3))$$
$$n \, l \, \rho \, e_2))$$
$$(n+1) \, l \, \rho \, e_1$$

$$\mathcal{E} \, k \, n \, l \, \rho \, (\grave{\mathcal{J}} e_1 e_2 e_3) = \mathcal{E} \, (\lambda n \, l \, v_1. \quad (27)$$
$$(\mathcal{E} \, (\lambda n \, l \, v_2.$$
$$(\mathcal{E} \, (\lambda n \, l \, v_3.$$
$$(k \, n \, l \, (\grave{\mathcal{J}} \, v_1 \, v_2 \, v_3)()))$$
$$n \, l \, \rho \, e_3))$$
$$n \, l \, \rho \, e_2))$$
$$(n+1) \, l \, \rho \, e_1$$

*FIG. 9*

$$\text{PRIMOPS } f\, x = A\, (\lambda n\, l\, v.n)\, 0\, \infty\, f\, x \quad (29)$$

$$\text{INTERRUPT } f\, x\, l = A\, (\lambda n\, l\, v.v)\, 0\, l\, f\, x \quad (30)$$

$$\text{RESUME } [\![k, f]\!] = A\, k\, 0\, \infty\, f\, \bot \quad (31)$$

*FIG. 10*

$$I f l = \langle (\lambda x. (\text{interrupt } f x l)), \rho_0[f \mapsto f][l \mapsto l] \rangle \quad (33)$$

$$R = \langle (\lambda z. (\text{resume})), \rho_0 \rangle \quad (34)$$

$$\mathcal{E} k n l \rho (\text{interrupt } e_1 e_2 e_3) \equiv \mathcal{E} (\lambda n l v_1. \quad (35)$$
$$\mathcal{E} (\lambda n l v_2.$$
$$\mathcal{E} (\lambda n l v_3.$$
$$\text{if } l = \infty$$
$$\text{then}(A k 0 v_3 v_1 v_2)$$
$$\text{else let } [\![k, f]\!] = (A k 0 l v_1 v_2)$$
$$\text{in } [\![k, (I f (v_3 - 1))]\!])$$
$$n l \rho e_3))$$
$$n l \rho e_2))$$
$$(n + 1) l \rho e_1$$

$$\mathcal{E} k n l \rho (\text{resume } e) \equiv \mathcal{E} (\lambda n l [\![k', f]\!]. \quad (36)$$
$$(A k' 0 l f \perp)$$
$$(n + 1) l \rho e$$

*FIG. 11*

To compute $(y, \check{x}) = \vec{\mathcal{J}} f x \check{y}$:

base case: $(y, \check{x}) = \vec{\mathcal{J}} f x \check{y}$  (0)

inductive case: $l = \text{PRIMOPS}\, f\, x$  (1)

$z = \text{INTERRUPT}\, f\, x\, \lfloor \frac{l}{2} \rfloor$  (2)

$(y, \check{z}) = \vec{\mathcal{J}} R\, z\, \check{y}$  (3)

$(z, \check{x}) = \vec{\mathcal{J}} \left( lf \lceil \frac{l}{2} \rceil \right) x\, \check{z}$  (4)

FIG. 12

$$\mathcal{E}\, k\, n\, l\, p\, (\vec{\mathcal{J}}\, e_1\, e_2\, e_3) = \mathcal{E}\, (\lambda n\, l\, v_1.$$
$$\mathcal{E}\, (\lambda n\, l\, v_2.$$
$$\mathcal{E}\, (\lambda n\, l\, v_3.$$
$$(k\, n\, l\, (\vec{\mathcal{J}}\, v_1\, v_2\, v_3)))$$
$$n\, l\, e_3))$$
$$n\, l\, e_2))$$
$$(n+1)\, l\, p\, e_1 \quad (45)$$

FIG. 13

$$\ulcorner x \urcorner [k] \rightsquigarrow k\, x \quad (47)$$
$$\ulcorner (\lambda x.e) \urcorner [k] \rightsquigarrow k\, (\lambda k'\, x. e[k']) \quad (48)$$
$$\ulcorner (e_1\, e_2) \urcorner [k] \rightsquigarrow \ulcorner e_1 \urcorner [(\lambda x_1. \ulcorner e_2 \urcorner [(\lambda x_2. (x_1\, k\, x_2))])] \quad (49)$$
$$e_0 \rightsquigarrow \ulcorner e_0 \urcorner [(\lambda x. x)] \quad (50)$$

*FIG. 14*

$$\lceil e|k,n,l \rceil \leadsto \langle\!\langle k \ (n+1) \ l \ e \rangle\!\rangle_{k,n,l} \qquad (51)$$

$$\lceil x|k,n,l \rceil \leadsto \langle\!\langle k \ (n+1) \ l \ x \rangle\!\rangle_{k,n,l} \qquad (52)$$

$$\lceil (\lambda x.e)|k,n,l \rceil \leadsto \langle\!\langle k \ (n+1) \ l \ (\lambda_4 k \ n \ l \ x. \lceil e|k,n,l \rceil) \rangle\!\rangle_{k,n,l} \qquad (53)$$

$$\lceil (e_1 \ e_2)|k,n,l \rceil \leadsto \langle\!\langle \lceil e_1|(\lambda_3 n \ l \ x_1. \qquad (54)$$
$$\lceil e_2|(\lambda_3 n \ l \ x_2.$$
$$(x_1 \ k \ n \ l \ x_2)),$$
$$n,l),$$
$$(n+1),l \rceil \rangle\!\rangle_{k,n,l}$$

$$\lceil (\text{if } e_1 \text{ then } e_2 \text{ else } e_3)|k,n,l \rceil \leadsto \langle\!\langle \lceil e_1|(\lambda_3 n \ l \ x_1. \qquad (55)$$
$$(\text{if } x_1$$
$$\text{then } \lceil e_2|k,n,l \rceil$$
$$\text{else } \lceil e_3|k,n,l \rceil)),$$
$$(n+1),l \rceil \rangle\!\rangle_{k,n,l}$$

$$\lceil (\diamond e)|k,n,l \rceil \leadsto \langle\!\langle \lceil e|(\lambda_3 n \ l \ x. \qquad (56)$$
$$(k \ n \ l \ (\diamond x))),$$
$$(n+1),l \rceil \rangle\!\rangle_{k,n,l}$$

$$\lceil (e_1 \bullet e_2)|k,n,l \rceil \leadsto \langle\!\langle \lceil e_1|(\lambda_3 n \ l \ x_1. \qquad (57)$$
$$\lceil e_2|(\lambda_3 n \ l \ x_2.$$
$$(k \ n \ l \ (x_1 \bullet x_2))),$$
$$n,l),$$
$$(n+1),l \rceil \rangle\!\rangle_{k,n,l}$$

$$\lceil (\vec{\mathcal{J}} \ e_1 \ e_2 \ e_3)|k,n,l \rceil \leadsto \langle\!\langle \lceil e_1|(\lambda_3 n \ l \ x_1. \qquad (58)$$
$$\lceil e_2|(\lambda_3 n \ l \ x_2.$$
$$\lceil e_3|(\lambda_3 n \ l \ x_3.$$
$$(k \ n \ l \ (\vec{\mathcal{J}} \ x_1 \ x_2 \ x_3))),$$
$$n,l),$$
$$n,l),$$
$$(n+1),l \rceil \rangle\!\rangle_{k,n,l}$$

$$\lceil (\overleftarrow{\mathcal{J}} \ e_1 \ e_2 \ e_3)|k,n,l \rceil \leadsto \langle\!\langle \lceil e_1|(\lambda_3 n \ l \ x_1. \qquad (59)$$
$$\lceil e_2|(\lambda_3 n \ l \ x_2.$$
$$\lceil e_3|(\lambda_3 n \ l \ x_3.$$
$$(k \ n \ l \ (\overleftarrow{\mathcal{J}} \ x_1 \ x_2 \ x_3))),$$
$$n,l),$$
$$n,l),$$
$$(n+1),l \rceil \rangle\!\rangle_{k,n,l}$$

$$\lceil (\check{\mathcal{J}} \ e_1 \ e_2 \ e_3)|k,n,l \rceil \leadsto \langle\!\langle \lceil e_1|(\lambda_3 n \ l \ x_1. \qquad (60)$$
$$\lceil e_2|(\lambda_3 n \ l \ x_2.$$
$$\lceil e_3|(\lambda_3 n \ l \ x_3.$$
$$(k \ n \ l \ (\check{\mathcal{J}} \ x_1 \ x_2 \ x_3))),$$
$$n,l),$$
$$n,l),$$
$$(n+1),l \rceil \rangle\!\rangle_{k,n,l}$$

$$\langle\!\langle e \rangle\!\rangle_{k,n,l} \leadsto \text{if } n = l \text{ then } [k. \lambda_4 k \ n \ l \ \_. e] \text{ else } e \qquad (61)$$

*FIG. 15*

$$A_3 \langle(\lambda_3 n\ l\ x.e),\rho\rangle\ n'\ l'\ v = \mathcal{E}\ \rho[n \mapsto n'][l \mapsto l'][x \mapsto v]\ e \quad (63)$$

$$A_4 \langle(\lambda_4 k\ n\ l\ x.e),\rho\rangle\ k'\ n'\ l'\ v = \mathcal{E}\ \rho[k \mapsto k'][n \mapsto n'][l \mapsto l'][x \mapsto v]\ e \quad (64)$$

$$\mathcal{E}\ \rho\ (\lambda_3 n\ l\ x.e) = \langle(\lambda_3 n\ l\ x.e),\rho\rangle \quad (65)$$

$$\mathcal{E}\ \rho\ (\lambda_4 k\ n\ l\ x.e) = \langle(\lambda_4 k\ n\ l\ x.e),\rho\rangle \quad (66)$$

$$\mathcal{E}\ \rho\ (e_1\ e_2\ e_3\ e_4) = A_3(\mathcal{E}\ \rho\ e_1)(\mathcal{E}\ \rho\ e_2)(\mathcal{E}\ \rho\ e_3)(\mathcal{E}\ \rho\ e_4) \quad (67)$$

$$\mathcal{E}\ \rho\ (e_1\ e_2\ e_3\ e_4\ e_5) = A_4(\mathcal{E}\ \rho\ e_1)(\mathcal{E}\ \rho\ e_2)(\mathcal{E}\ \rho\ e_3)(\mathcal{E}\ \rho\ e_4)(\mathcal{E}\ \rho\ e_5) \quad (68)$$

$$\mathcal{E}\ \rho\ (\text{interrupt}\ e_1\ e_2\ e_3) = \text{let}\ v_1 = (\mathcal{E}\ \rho\ e_1) \quad (69)$$
$$v_2 = (\mathcal{E}\ \rho\ e_2)$$
$$v_3 = (\mathcal{E}\ \rho\ e_3)$$
$$k = \rho\ \text{'k'}$$
$$l = \rho\ \text{'l'}$$
$$\text{in if}\ l = \infty$$
$$\text{then}\ (A_4\ v_1\ k\ 0\ v_3\ v_2)$$
$$\text{else let}\ [\![k,f]\!] = (A_4\ v_1\ k\ 0\ l\ v_2)$$
$$\text{in}\ [\![k,(I\ f\ (v_3 - l))]\!]$$

$$\mathcal{E}\ \rho\ (\text{resume}\ e) = \text{let}\ [\![k',f]\!] = (\mathcal{E}\ \rho\ e) \quad (70)$$
$$l = \rho\ \text{'l'}$$
$$\text{in}\ (A_4\ f\ k'\ 0\ l\ \bot)$$

$$\vec{\mathcal{J}}\ v_1\ v_2\ \acute{v}_3 = \text{let}\ (v_4 \triangleright \acute{v}_5) = (A_4\ v_1\ \langle(\lambda_3 n\ l\ v.v),\rho_0\rangle\ 0\ \infty\ (v_2 \triangleright \acute{v}_3)) \quad (71)$$
$$\text{in}\ (v_4, \acute{v}_5)$$

$$\overleftarrow{\mathcal{J}}\ v_1\ v_2\ \acute{v}_3 = \text{let}\ (v_4 \triangleleft \acute{v}_5) = ((A_4\ v_1\ \langle(\lambda_3 n\ l\ v.v),\rho_0\rangle\ 0\ \infty\ v_2) \triangleleft \acute{v}_3) \quad (72)$$
$$\text{in}\ (v_4, \acute{v}_5)$$

$$\text{PRIMOPS}\ f\ x = A_4\ f\ \langle(\lambda_3 n\ l\ v.n),\rho_0\rangle\ 0\ \infty\ x \quad (73)$$

$$\text{INTERRUPT}\ f\ l\ n = A_4\ f\ \langle(\lambda_3 n\ l\ v.v),\rho_0\rangle\ 0\ l\ x \quad (74)$$

$$I\ f\ l = \langle(\lambda_4 k\ n\ l\ x.(\text{interrupt}\ f\ x\ l)),\rho_0[f \mapsto f][l \mapsto l]\rangle \quad (75)$$

$$R = \langle(\lambda_4 k\ n\ l\ z.(\text{resume}\ z)),\rho_0\rangle \quad (76)$$

*FIG. 16*

$$S\,\pi\,() = \text{null\_constant} \tag{77}$$
$$S\,\pi\,\textbf{true} = \text{true\_constant} \tag{78}$$
$$S\,\pi\,\textbf{false} = \text{false\_constant} \tag{79}$$
$$S\,\pi(c_1, c_2) = \text{cons}((S\,\pi\,c_1), (S\,\pi\,c_2)) \tag{80}$$
$$S\,\pi\,n = n \tag{81}$$
$$S\,\pi\,\text{'k'} = \text{continuation} \tag{82}$$
$$S\,\pi\,\text{'n'} = \text{count} \tag{83}$$
$$S\,\pi\,\text{'l'} = \text{limit} \tag{84}$$
$$S\,\pi\,\text{'x'} = \text{argument} \tag{85}$$
$$S\,\pi\,x = \text{as\_closure(target)->environment}[\pi\,x] \tag{86}$$
$$S\,\pi\,(\lambda_3 n\,l\,x.e) = (\{ \tag{87}$$

```
            thing function(thing target,
                          thing count,
                          thing limit,
                          thing argument) {
                return (S (φ e) e);
            }
            thing lambda = (thing)GC_malloc(sizeof(struct {
                enum tag;
                struct {
                    thing (*function)();
                    unsigned n;
                    thing environment[|φe|];
                }
            }
            set_closure(lambda);
            as_closure(lambda)->function = &function
            as_closure(lambda)->n = |φ e|;
            as_closure(lambda)->environment[0] = S π (φ e)₀
            ⋮
            as_closure(lambda)->environment[|φ e| - 1] = S π (φ e)_{|φ e|-1}
            lambda;
        })
```

FIG. 17

$$S\,\pi\,(\lambda_3 n\,l\,x.e) = (\{ \qquad\qquad\qquad\qquad\qquad\qquad\qquad\qquad\qquad\qquad\qquad\qquad\qquad\qquad (88)$$

```
            thing function(thing target,
                           thing count,
                           thing continuation,
                           thing limit,
                           thing argument) {
               return (S (φ e) e);
            }
            thing lambda = (thing)GC_malloc(sizeof(struct {
               enum tag;
               struct {
                  thing (*function)();
                  unsigned n;
                  thing environment[|φe|];
               }
            }
            set_closure(lambda);
            as_closure(lambda)->function = &function
            as_closure(lambda)->n = |φ e|;
            as_closure(lambda)->environment[0] = S π (φ e)₀
            ⋮
            as_closure(lambda)->environment[|φ e| - 1] = S π (φ e)|φ e|−1
            lambda;
         })
```

$$S\,\pi\,(e_1\,e_2\,e_3\,e_4) = \text{continuation\_apply}((S\,\pi\,e_1),$$
$$(S\,\pi\,e_2),$$
$$(S\,\pi\,e_3),$$
$$(S\,\pi\,e_4))$$

$$S\,\pi\,(e_1\,e_2\,e_3\,e_4\,e_5) = \text{converted\_apply}((S\,\pi\,e_1),$$
$$(S\,\pi\,e_2),$$
$$(S\,\pi\,e_3),$$
$$(S\,\pi\,e_4),$$
$$(S\,\pi\,e_5))$$

$$S\,\pi\,(if\ e_1\ then\ e_2\ else\ e_3) = (!\text{is\_false}((S\,\pi\,e_1))?(S\,\pi\,e_2):(S\,\pi\,e_3)) \qquad (91)$$

$$S\,\pi\,(\diamond\,e) = (N\ \diamond)((S\,\pi\,e)) \qquad (92)$$

$$S\,\pi\,(e_1 \bullet e_2) = (N\ \bullet)((S\,\pi\,e_1),(S\,\pi\,e_2)) \qquad (93)$$

$$S\,\pi\,(\vec{J}\,e_1\,e_2\,e_3) = (N\,\vec{J})((S\,\pi\,e_1),(S\,\pi\,e_2),(S\,\pi\,e_3)) \qquad (94)$$

$$S\,\pi\,(\overleftarrow{J}\,e_1\,e_2\,e_3) = (N\,\overleftarrow{J})((S\,\pi\,e_1),(S\,\pi\,e_2),(S\,\pi\,e_3)) \qquad (95)$$

$$S\,\pi\,(\overset{\prime}{J}\,e_1\,e_2\,e_3) = (N\,\overset{\prime}{J})((S\,\pi\,e_1),(S\,\pi\,e_2),(S\,\pi\,e_3)) \qquad (96)$$

*FIG. 18*

SYSTEM AND METHOD FOR DIVIDE-AND-CONQUER CHECKPOINTING

CROSS-REFERENCE TO RELATED APPLICATIONS

The present application is a continuation of U.S. patent application Ser. No. 16/336,094, filed on Mar. 22, 2019, the contents of which are hereby incorporated by reference in its entirety. U.S. patent application Ser. No. 16/336,094 claims priority to International Patent Application No. PCT/US2017/051426, filed on Sep. 13, 2017, which claims the benefit of U.S. provisional application serial No. 62/393,894, filed Sep. 13, 2016, the contents of which are hereby incorporated by reference in their entireties.

STATEMENT REGARDING GOVERNMENT FUNDING

This invention was made with government support under 1522954-IIS awarded by the National Science Foundation. The government has certain rights in the invention.

TECHNICAL FIELD

The present application relates to computer processing systems, and more specifically, to a system and method for divide-and-conquer checkpointing, such as binomial checkpointing which eliminates the need for user annotation.

BACKGROUND

Algorithm Differentiation (AD) is an established enterprise that seeks to take the derivatives of functions specified as computer programs through symbolic manipulation rather than finite differencing. Reverse-mode AD can be thought of as taking a data-flow graph $f$ that maps an n-dimensional input vector to an m-dimensional output vector, and augments it to also map an in-dimensional vector (a co-tangent of the output vector) to an n-dimensional vector (the consequent co-tangent of the input vector). If we say $z=f(x)$, then reverse-mode AD maps $z^*$ to $x^*=\text{transpose}(J) z^*$, where J is the Jacobian matrix (the matrix of partial derivatives) of $f$ at x. This is done by constructing an adjoint computation, which has the same data flow graph as $f$ but with the directions of flow reversed (a "reverse sweep"). Propagating values through that data flow graph requires knowing the values that were propagated during the original computation f. Storing these can impose very high memory burden, making this process infeasible when computing f calculates many intermediate values, or equivalently, when computing f takes substantial time. Essentially, the storage burden of reverse-mode AD of $f$ is proportional to the run-time of $f$.

Checkpoint reverse-mode AD is a method which splits a computation flow graph (say, one computing the function f) into two pieces (so $f=h \circ g$) where the computational burdens of h and g are roughly equal. We can then calculate the reverse-mode AD of f using the reverse-mode AD of h and the reverse-mode AD of g, in turn. Say $z=f(x)$, then the reverse-mode AD of f maps a co-tangent of z, say $z^*$, to a co-tangent of x, say $x^*$. This can be done in two phases if we let $y=g(x)$ and $z=h(y)$, then we can first perform the reverse AD of h to map $z^*$ to $y^*$, then perform the reverse AD of g to map $y^*$ to $x^*$. Doing this reduces the storage burden by roughly a factor of two, since only half of the intermediate values of the decomposed $f$ need be stored at a time. On the other hand, it requires calculating g(x) twice, first to find y, and again later to store the intermediate values of computing g(x) needed for the reverse-mode AD of g. Doing this in a recursive fashion (where the computation of g(x) and h(y) might each in turn be split into two halves) reduces the storage burden at the expense of extra computation. The term is sometimes generalized to when the computation of $f$ may be divided into more than two pieces; we discuss division into two pieces for the sake of clarity.

Prior art methods have only been able to apply checkpoint reverse-mode AD when the computation of $f$ is done by a loop each iteration of which requires a bounded amount of computation. For example, when the program is in the form of such a loop, breaking the computation $z=f(x)$ into two phases, $y=g(x)$ and $z=h(y)$, can be done as follows: the loop can be run half-way for g, and the remaining half for h. However, this limits the application and prevents use in more complex control architectures. Therefore, improvements are needed in the field.

SUMMARY

According to one aspect, the present disclosure provides a system and method which allows the basic checkpoint-reverse-mode AD strategy (of recursively decomposing the computation to reduce storage requirements of reverse-mode AD) to be applied to arbitrary programs: not just programs consisting of loops, but programs with arbitrarily complex control flow. The method comprises (a) transforming the program into a formalism that allows convenient manipulation by formal tools, and (b) introducing a set of operators to allow computations to be decomposed by running them for a given period of time then pausing them, while treating the paused program as a value subject to manipulation.

BRIEF DESCRIPTION OF THE DRAWINGS

In the following description and drawings, identical reference numerals have been used, where possible, to designate identical features that are common to the drawings.

FIG. 1c is a computer program execution diagram that depicts a process in which a checkpoint is introduced for the execution interval $[p_0; p_3)$.

FIG. 3 is a computer code listing illustrating a direct-style evaluator for the core checkpointVLAD language.

FIG. 4 is a computer code listing illustrating additions to the direct-style evaluator for checkpointVLAD to support AD.

FIG. 5 is a computer code listing illustrating a process for binary checkpointing.

FIG. 6 is a computer code listing illustrating a general-purpose interruption and resumption interface.

FIG. 7 is a computer code listing illustrating binary bisection checkpointing via the general-purpose interruption and resumption interface.

FIG. 8 is a computer code listing illustrating a CPS evaluator for the core checkpointVLAD language.

FIG. 9 is a computer code listing illustrating additions to the CPS evaluator for checkpointVLAD to support AD.

FIG. 10 is a computer code listing illustrating implementation of the general-purpose interruption and resumption interface using the CPS evaluator.

FIG. 11 is a computer code listing illustrating additions to the CPS evaluator for checkpointVLAD to expose the general-purpose interruption and resumption interface to the target.

FIG. 12 is a computer code listing illustrating binary bisection checkpointing in the CPS evaluator.

FIG. 13 is a computer code listing illustrating an addition to the CPS evaluator for checkpointVLAD to support divide-and-conquer checkpointing.

FIG. 14 is a computer code listing illustrating CPS conversion for the untyped lambda calculus.

FIG. 15 is a computer code listing illustrating CPS conversion for the checkpointVLAD language that threads step counts and limits.

FIG. 16 is a computer code listing illustrating Extensions to the direct-style evaluator and the implementation of the general-purpose interruption and resumption interface to support divide-and-conquer checkpointing on target code that has been converted to CPS.

FIG. 17 is a computer code listing illustrating a first portion of a compiler for the checkpointVLAD language when in CPS.

FIG. 18 is a computer code listing illustrating a second portion of a compiler for the checkpointVLAD language when in CPS.

The attached drawings are for purposes of illustration and are not necessarily to scale.

DETAILED DESCRIPTION

In the following description, some aspects will be described in terms that would ordinarily be implemented as software programs. Those skilled in the art will readily recognize that the equivalent of such software can also be constructed in hardware, firmware, or micro-code. Because data-manipulation algorithms and systems are well known, the present description will be directed in particular to algorithms and systems forming part of, or cooperating more directly with, systems and methods described herein. Other aspects of such algorithms and systems, and hardware or software for producing and otherwise processing the signals involved therewith, not specifically shown or described herein, are selected from such systems, algorithms, components, and elements known in the art. Given the systems and methods as described herein, software not specifically shown, suggested, or described herein that is useful for implementation of any aspect is conventional and within the ordinary skill in such arts.

The following terminology shall be interpreted herein as follows: An execution point is a point in time during the execution of a program. A program point is a location in the program code. Since program fragments might be invoked zero or more times during the execution of a program, each execution point corresponds to exactly one program point but each program point may correspond to zero or more execution points. An execution interval is a time interval spanning two execution points. A program interval is a fragment of code spanning two program points. Program intervals are usually constrained so that they nest, i.e., they do not cross one boundary of a syntactic program construct without crossing the other. Each program interval may correspond to zero or more execution intervals, those execution intervals whose endpoints result from the same invocation of the program interval. Each execution interval corresponds to at most one program interval. An execution interval might not correspond to a program interval because the endpoints might not result from the same invocation of any program interval.

Figure 1A:
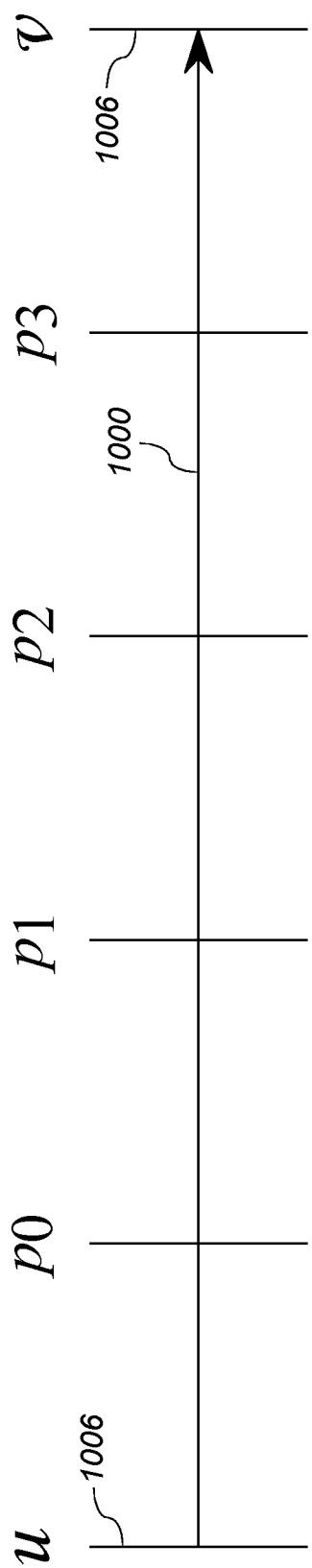
FIG. 1a is a timing diagram that depicts a primal computation, $y=f(x)$, which takes t time steps, with x being a portion of the program state at execution point u and y being a portion of the program state at execution point v computed from x.

FIGS. 1 and 2 illustrate the process of performing reverse-mode AD with and without checkpointing. Control flows from top to bottom, and along the direction of the arrow within each row. The symbols u, v, and $p_0, \ldots, p_6$ denote execution points in the primal, a being the start of the computation whose derivative is desired, v being the end of that computation, and each $p_i$ being an intermediate execution point in that computation. Reverse mode involves various sweeps, whose execution intervals are represented as horizontal green (1000), red (1002), and blue (1004) lines. Green lines 1000 denote (re)computation of the primal without taping. Red lines 1002 denote computation of the primal with taping, i.e., the forward sweep of reverse mode. Blue lines 1004 denote computation of the Jacobian-transpose-vector product, i.e., the reverse sweep of reverse mode. The vertical black lines 1006 denote collections of execution points across the various sweeps that correspond to execution points in the primal, each particular execution point being the intersection of a horizontal line and a vertical line. In portions of FIGS. 1 and 2 other than FIG. 1(a), execution points for other sweeps besides the primal in a given collection are referred to with the symbols u, v, and $p_0, \ldots, p_6$ when the intent is clear. The vertical violet (1008), gold (1010), pink (1012), and brown (1014) lines denote execution intervals for the lifetimes of various saved values. Violet lines 1008 denote the lifetime of a value saved on the tape during the forward sweep and used during the reverse sweep. The value is saved at the execution point at the top of the violet line 1008 and used once at the execution point at the bottom of that line. Gold (1010) and pink (1012) lines denote the lifetime of a snapshot. The snapshot is saved at the execution point at the top of each gold 1010 or pink 1012 line and used at various other execution points during its lifetime. Green lines 1000 emanating from a gold 1010 or pink 102 line indicate restarting a portion of the primal computation from a saved snapshot.

Figure 1B:
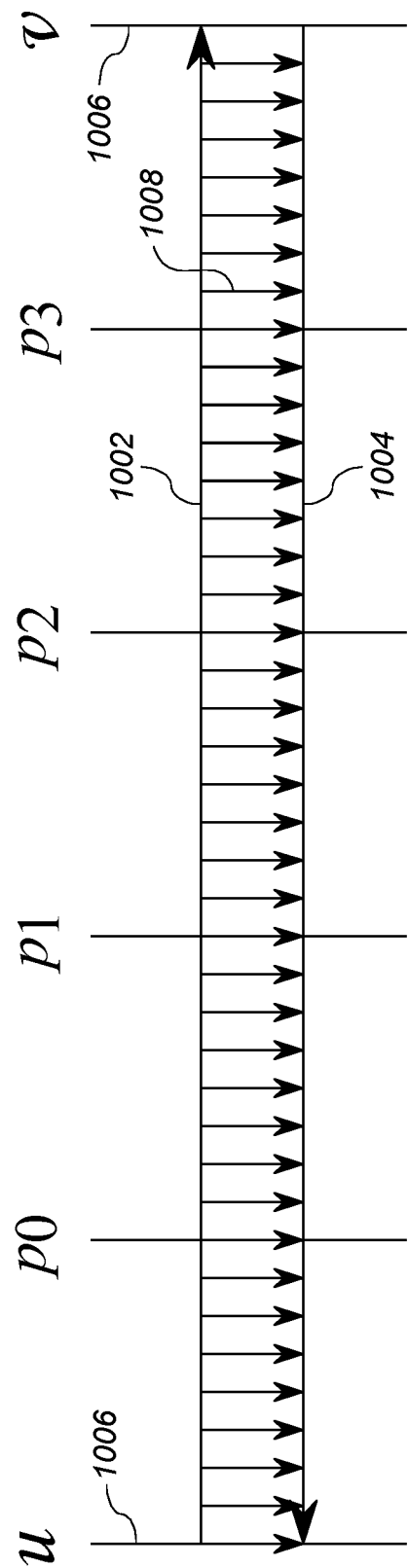
FIG. 1b is a computer program execution diagram that depicts a classical reverse mode without checkpointing.

FIG. 1(a) depicts the primal computation, y=f(x), which takes t time steps, with x being a portion of the program state at execution point u and y being a portion of the program state at execution point v computed from x. Such is performed without taping (green line 1000). FIG. 1(b) depicts classical reverse mode without checkpointing. An uninterrupted forward sweep (red line 1002) is performed for the entire length of the primal, then an uninterrupted reverse sweep (blue line 1004) is performed for the entire length. Since the tape values are consumed in reverse order from which they are saved, the requisite tape length is O(t). FIG. 1(c) depicts a checkpoint introduced for the execution interval [$p_0$, $p_3$]. This interrupts the forward sweep and delays a portion of that sweep until the reverse sweep. Execution proceeds by a forward sweep (red lines 1002) that tapes during the execution interval [u, $p_0$], a primal sweep (green line 1000) without taping during the execution interval [$p_0$, $p_3$], a taping forward sweep (red line 1002) during the execution interval [$p_3$, v], a reverse sweep (blue line 1004) during the execution interval [v, $p_3$], a taping forward sweep (red line 1002) during the execution interval [$p_0$, $p_3$], a reverse sweep (blue line 1004) during the execution interval [$p_3$, $p_0$], and then a reverse sweep (blue line 1004) during the execution interval [$p_0$, u]. The forward sweep for the execution interval [$p_0$, $p_3$] is delayed until after the reverse sweep for the execution interval [v, $p_3$]. As a result of such reordering, the tapes required for those sweeps are not simultaneously live. Thus the requisite tape length is the maximum of the two tape lengths, not their sum. This savings comes at a cost. To allow such out-of-order execution, a snapshot (gold line 1010) must be saved at $p_0$ and the portion of the primal during the execution interval [$p_0$, $p_3$] must be computed twice, first without taping (green line 1000) then with (red line 1002).

Figure 1D:
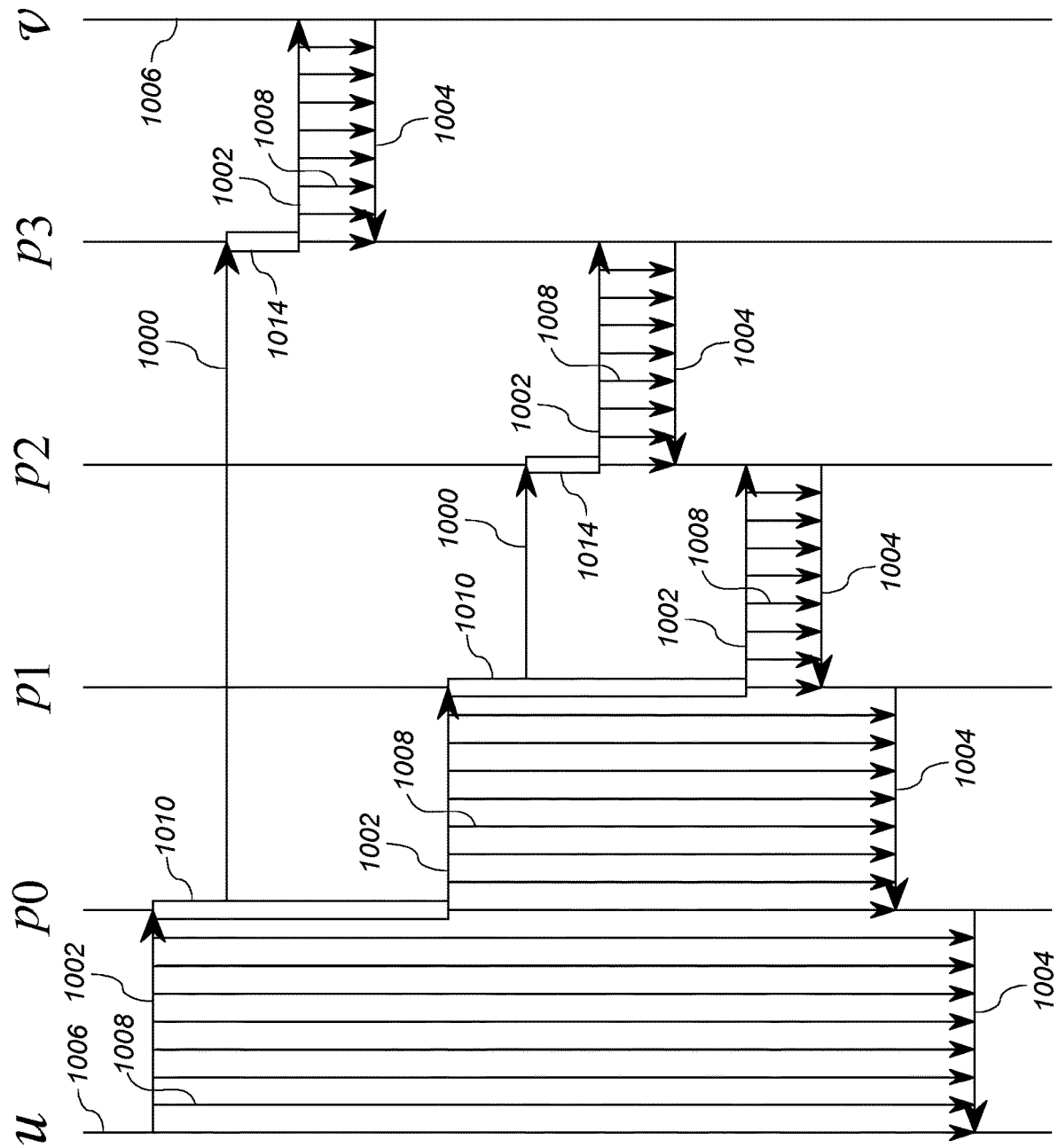
FIG. 1d is a computer program execution diagram that depicts a process in which a checkpoint is introduced into a portion of the forward sweep that has been delayed.

A checkpoint can be introduced into a portion of the forward sweep that has been delayed, as shown in FIG. 1(d). An additional checkpoint can be introduced for the execution interval [$p_1$, $p_2$]. This will delay a portion of the already delayed forward sweep even further. As a result, the portions of the tape needed for the three execution intervals [$p_1$, $p_2$], [$p_2$, $p_3$], and [$p_3$, v] are not simultaneously live, thus further reducing the requisite tape length, but requiring more (re)computation of the primal (green line 1000). The execution intervals for multiple checkpoints must either be disjoint or must nest; the execution interval of one checkpoint cannot cross one endpoint of the execution interval of another checkpoint without crossing the other endpoint.

Execution intervals for checkpoints can be specified in a variety of ways: "program interval," wherein execution intervals of specified program intervals constitute checkpoints, "subroutine call site," wherein execution intervals of specified subroutine call sites constitute checkpoints, and "subroutine body," wherein execution intervals of specified subroutine bodies constitute checkpoints. Nominally, these have the same power; with any one, one could achieve the effect of the other two. Specifying a subroutine body may be accomplished by specifying all call sites to that subroutine. Specifying some call sites but not others may be accomplished by having two variants of the subroutine, one whose body is specified and one whose is not, and calling the appropriate one at each call site. Specifying a program interval may be accomplished by extracting that interval as a subroutine.

Certain programming engines, such as TAPENADE, allow the user to specify program intervals for checkpoints with the c$ad checkpoint-start and c$ad checkpoint-end pragmas. Tapenade, by default, checkpoints all subroutine calls. This default can be overridden for named subroutines with the -nocheckpoint command-line option and for both named subroutines and specific call sites with the c$ad nocheckpoint pragma.

Figure 2A:
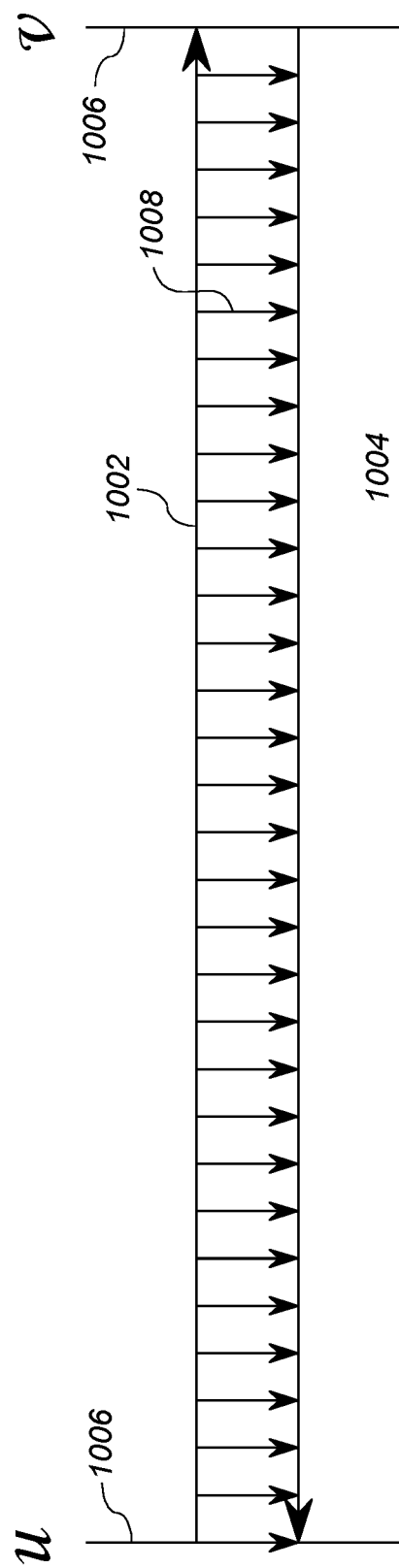
FIG. 2a is a computer program execution diagram that depicts forward and reverse sweeps spanning an entire root execution interval.

Recursive application of checkpointing in a divide-and-conquer fashion, i.e., "treeverse," can divide the forward and reverse sweep into stages run sequentially. The key idea is that only one stage is live at a time, thus requiring a shorter tape. However, the state of the primal computation at various intermediate execution points needs to be saved as snapshots, in order to (re)run the requisite portion of the primal to allow the forward and reverse sweeps for each stage to run in turn. This process is illustrated in FIG. 2. Consider a root execution interval [u, v] of the derivative calculation. Without checkpointing, the forward and reverse sweeps span the entire root execution interval, as shown in FIG. 2(a). One can divide the root execution interval [u, v] into two subintervals [u, p) and [p, v] at the split point p and checkpoint the first subinterval [u, v]. This divides the forward (red line 1002) and reverse (blue line 1004) sweeps into two stages. These two stages are not simultaneously live. If the two subintervals are the same length, this halves the storage needed for the tape at the expense of running the primal computation for [u, p) twice, first without taping (green line 1000), then with taping (red line 1002). This requires a single snapshot (gold line 1010) at u. This process can be viewed as constructing a binary checkpoint tree

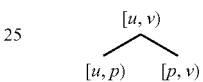

whose nodes are labeled with execution intervals, the intervals of the children of a node are adjacent, the interval of node is the disjoint union of the intervals of its children, and left children are checkpointed.

One can construct a left-branching binary checkpoint tree over the same root execution interval [u, v] with the split points $p_0$, $p_1$, and $p_2$:

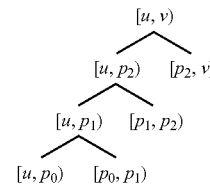

This can also be viewed as constructing an n-ary checkpoint tree:

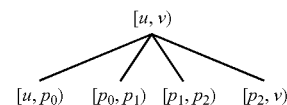

Where all children but the rightmost are checkpointed. This leads to nested checkpoints for the execution intervals [u, $p_0$), [u, $p_1$), and [u, $p_2$) as shown in FIG. 2(c). Since the starting execution point u is the same for these intervals, a single snapshot (gold line 1010) with longer lifetime suffices. These checkpoints divide the forward (red line 1002) and reverse (blue line 1004) sweeps into four stages. This allows the storage needed for the tape to be reduced arbitrarily (i.e., the red 1002 and blue 1004 segments can be made arbitrarily short), by rerunning successively shorter prefixes of the primal computation (green line 1000), without taping, running only short segments (red line 1002) with taping. This requires O(t) increase in time for (re)computation of the primal (green line 1000).

Alternatively, one can construct a right-branching binary checkpoint tree over the same root execution interval [u, v) with the same split points $p_0$, $p_1$, and $p_2$:

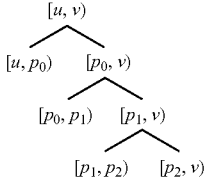

This also divides the forward (red) and reverse (blue 1004) sweeps into four stages. With this, the requisite tape length (the maximal length of the red 1002 and blue 1004 segments) can be reduced arbitrarily while running the primal (green line 1000) just once, by saving more snapshots (gold line 1010 and pink line 1012), as shown in FIG. 2(d). This requires O(t) increase in space for storage of the live snapshots (gold line 1010 and pink line 1012).

Thus it is shown that divide-and-conquer checkpointing can make the requisite tape arbitrarily small with either left- or right-branching binary checkpoint trees. This involves a space-time tradeoff. The left-branching binary checkpoint trees require a single snapshot but O(t) increase in time for (re)computation of the primal (green 1000). The right-branching binary checkpoint trees require O(t) increase in space for storage of the live snapshots (gold line 1010 and pink line 1012) but (re)run the primal only once.

One can also construct a complete binary checkpoint tree over the same root execution interval [u, v) with the same split points p0, p1, and p2:

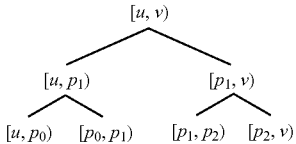

Figure 2B:
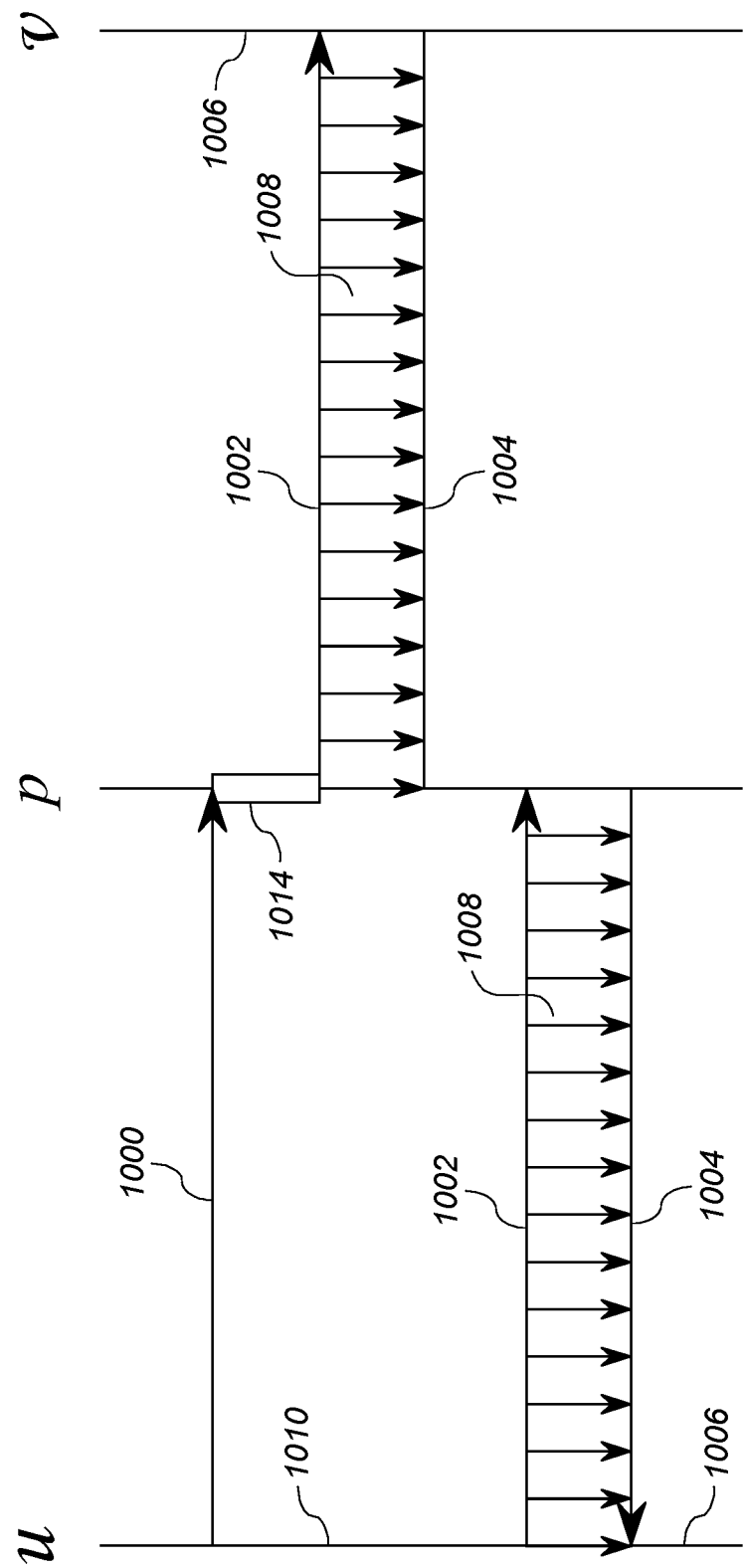
FIG. 2b is a computer program execution diagram wherein the root execution interval [u; v) is divided into two subintervals, with the first subinterval checkpointed.
Figure 2C:
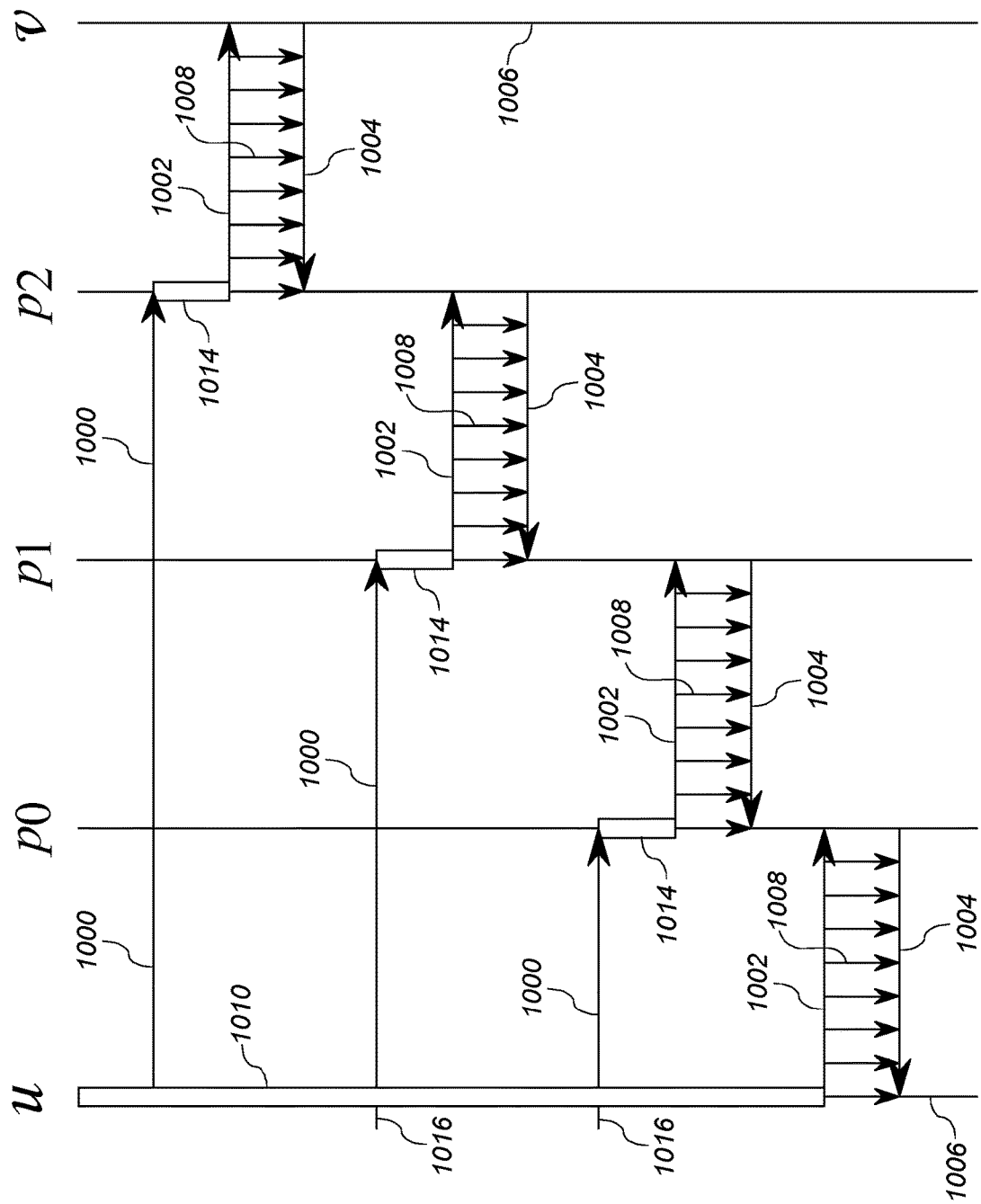
FIG. 2c is a computer program execution diagram illustrating nested checkpoints.
Figure 2D:
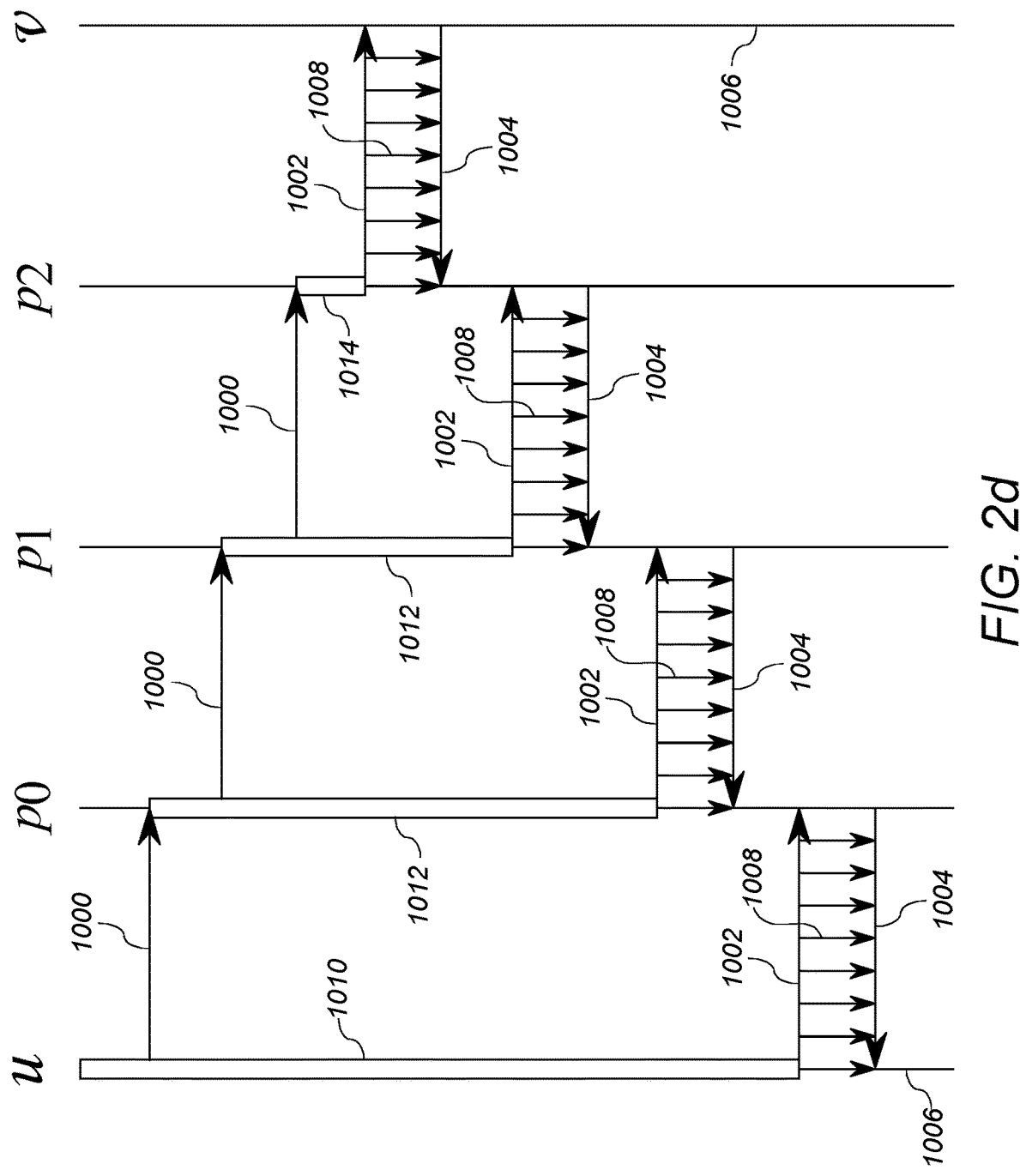
FIG. 2d is a computer program execution diagram based on a right-branching binary checkpoint tree over an execution interval having four stages.
Figure 2E:
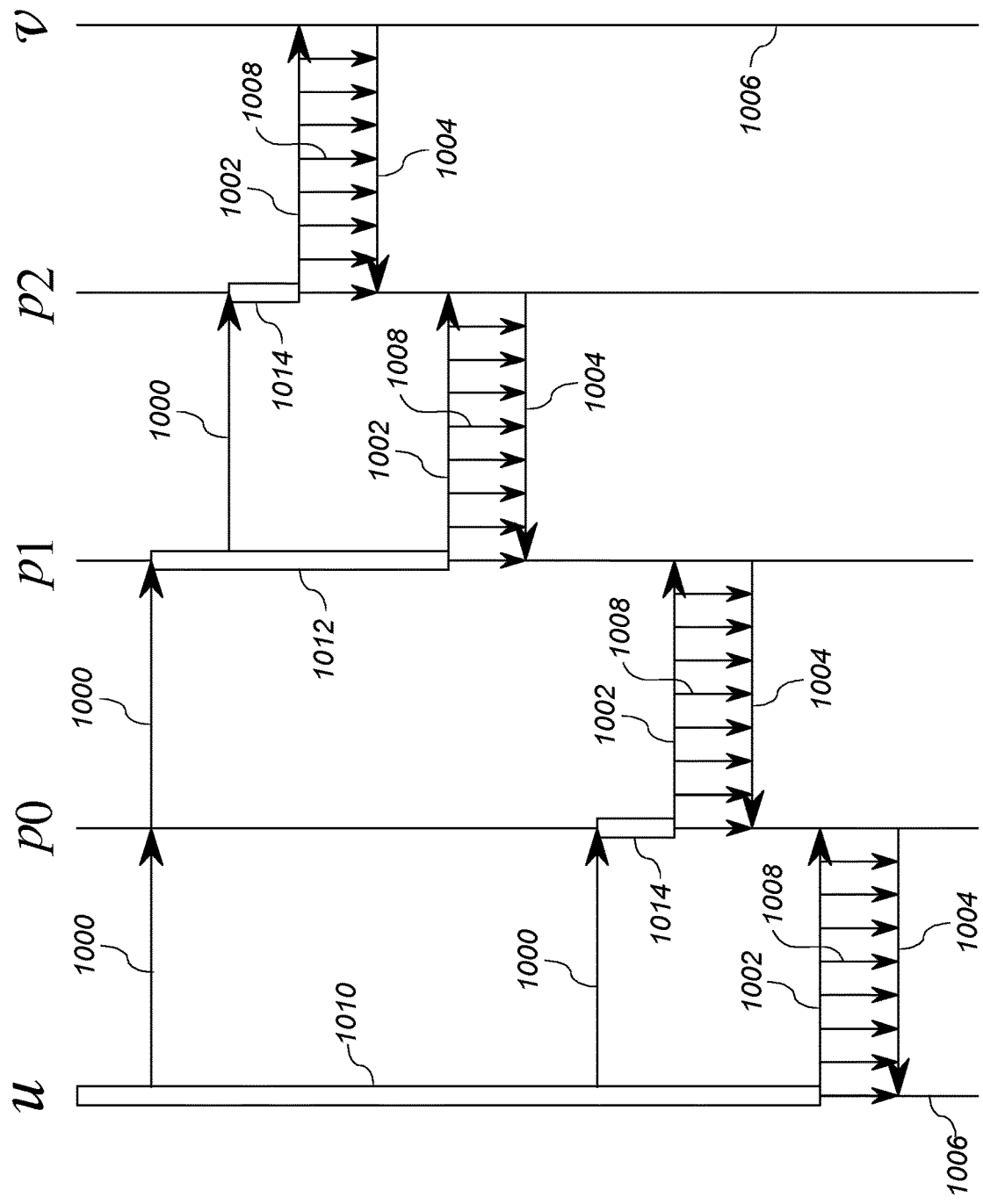
FIG. 2e is a computer program execution diagram based on a complete binary checkpoint tree having four stages.
Figure 2F:
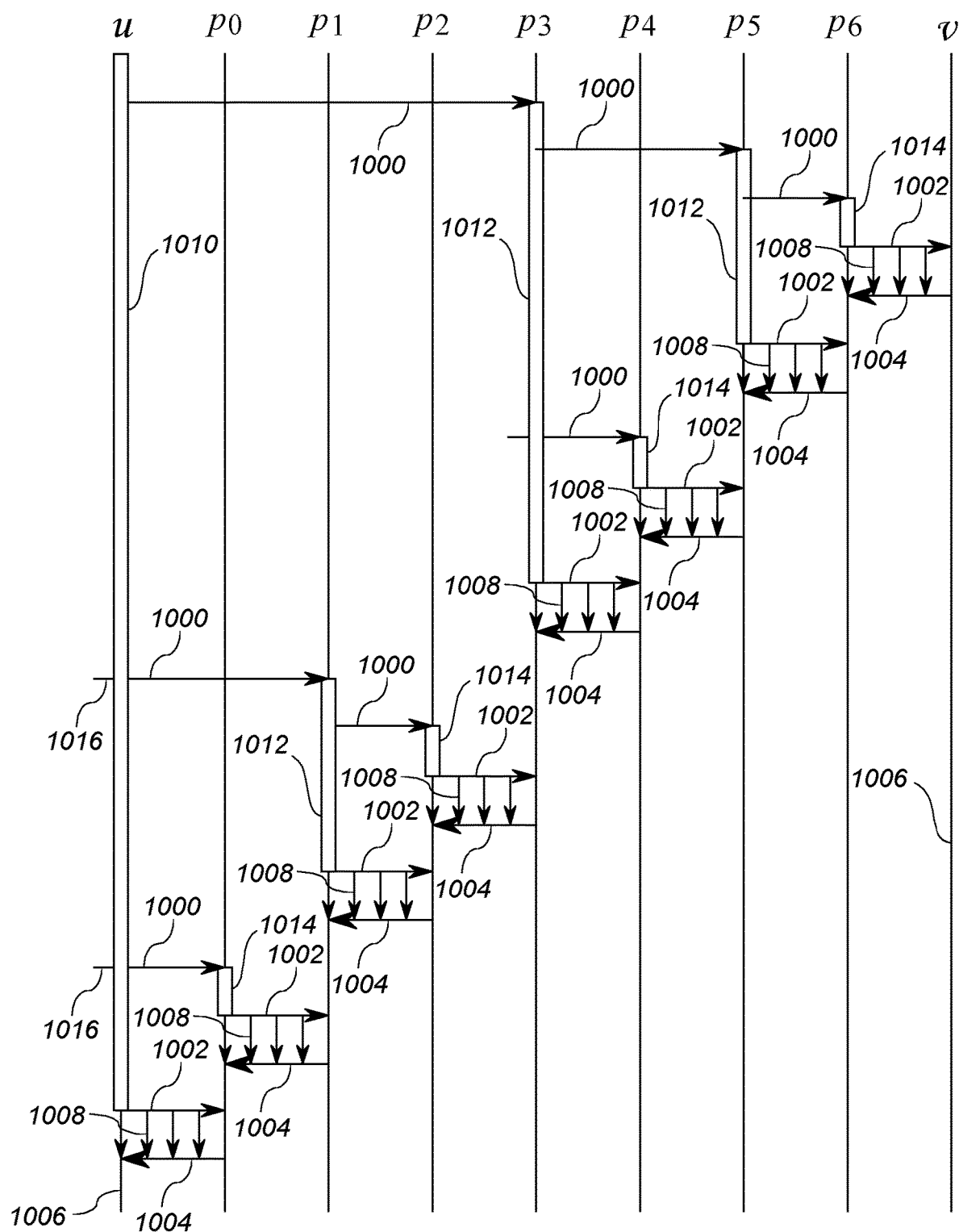
FIG. 2f is a computer program execution diagram based on a binary checkpoint tree having eight stages.

This constitutes application of the approach from FIG. 2(b) in a divide-and-conquer fashion as shown in FIG. 2(e). This also divides the forward (red line 1002) and reverse (blue line 1004) sweeps into four stages. One can continue this divide-and-conquer process further, with more split points, more snapshots, and more but shorter stages, as shown in FIG. 2(f). This leads to O(log t) increase in space for storage of the live snapshots (gold line 1010 and pink line 1012) and O(log t) increase in time for (re)computation of the primal (green line 1000). Variations of this technique can tradeoff between different improvements in space and/or time complexity, leading to overhead in a variety of sublinear asymptotic complexity classes in one or both. In order to apply this technique, the system must be able to construct a checkpoint tree of the desired shape with appropriate split points. This in turn requires the ability to interrupt the primal computation at appropriate execution points, save the interrupted execution state as a capsule, and restart the computation from the capsules, sometimes repeatedly.

Any given divide-and-conquer decomposition of the same root execution interval with the same split points can be viewed as either a binary checkpoint tree or an n-ary checkpoint tree. Thus FIG. 2(e) can be viewed as either of the following:

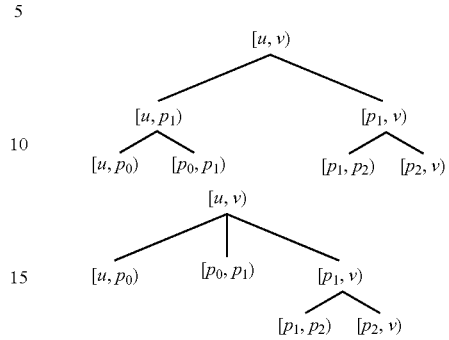

Similarly, FIG. 2(f) can be viewed as either of the following:

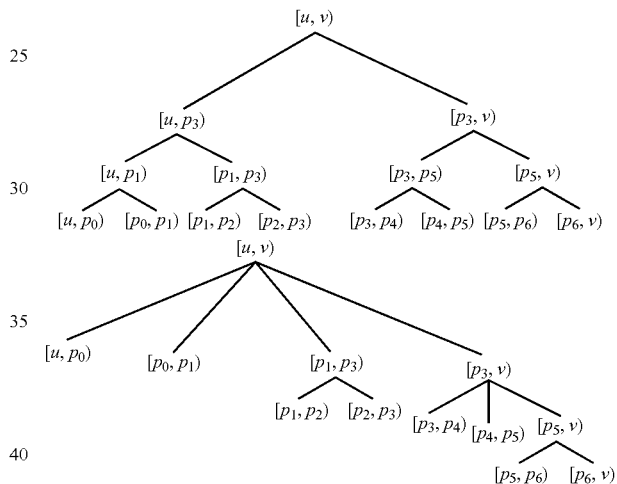

Thus, two algorithms to perform divide-and-conquer checkpointing may be distinguished as follows: "binary," wherein the system constructs a binary checkpoint tree, and "treeverse," wherein the system constructs an n-ary checkpoint tree.

There is, however, a simple correspondence between associated binary and n-ary check-point trees. The n-ary checkpoint tree is derived from the binary checkpoint tree by coalescing each maximal sequence of left branches into a single node. Thus as described hereinbelow, that these two algorithms exhibit the same properties.

Note that (divide-and-conquer) checkpointing does not incur any space or time over-head in the forward or reverse sweeps themselves (i.e., the number of violet lines 1008 and the total length of red 1002 and blue 1004 lines). Any space overhead results from the snapshots (gold 1010 and pink 1012 lines) and any time overhead results from (re)computation of the primal (green line 1000).

Several design choices arise in the application of divide-and-conquer checkpointing in addition to the choice of binary vs. n-ary checkpoint trees. For example, what root execution interval(s) should be subject to divide-and-conquer checkpointing? Further, which execution points are candidate split points? The divide-and-conquer process of constructing the checkpoint tree will select actual split points from these candidates. Moreover, what is the shape or depth of the checkpoint tree, i.e., what is the termination criterion for the divide-and-conquer process?

Since the leaf nodes of the checkpoint tree correspond to stages, the termination criterion and the number of evaluation steps in the stage at each leaf node (the length of a pair of red 1002 and blue 1004 lines) are mutually constrained. The number of live snapshots at a leaf (how many gold 1010 and pink 1012 lines are crossed by a horizontal line drawn leftward from that stage, the pair of red 1002 and blue 1004 lines, to the root) depends on the depth of the leaf and its position in the checkpoint tree. Different checkpoint trees, with different shapes resulting from different termination criteria and split points, can lead to a different maximal number of live snapshots, resulting in different storage requirements. The amount of (re)computation of the primal (the total length of the green lines 1000) can also depend on the shape of the checkpoint tree, thus different checkpoint trees, with different shapes resulting from different termination criteria and split points, can lead to different compute-time requirements. Thus different strategies for specifying the termination criterion and the split points can influence the space-time tradeoff.

Note the distinctions between several different approaches to selecting root execution intervals subject to divide-and-conquer checkpointing:

Loop: Execution intervals resulting from invocations of specified DO loops are subject to divide-and-conquer checkpointing.

entire derivative calculation: The execution interval for an entire specified derivative calculation is subject to divide-and-conquer checkpointing.

Note further distinctions between several different approaches to selecting candidate split points:

iteration boundary: Iteration boundaries of the DO loop specified as the root execution interval are taken as candidate split points.

arbitrary: Any execution point inside the root execution interval can be taken as a candidate split point.

Note a further distinction between several different approaches to specifying the termination criterion and deciding which candidate split points to select as actual split points:

Bisection: Split points are selected so as to divide the computation dominated by a node in half as one progresses successively from right to left among children. One can employ a variety of termination criteria. If the termination criterion is such that the total number of leaves is a power of two, one obtains a complete binary checkpoint tree. A termination criterion that bounds the number of evaluation steps in a leaf limits the size of the tape and achieves logarithmic overhead in both asymptotic space and time complexity compared with the primal.

Binomial: Split points are selected using various criterion. Different termination criteria can be selected to control space-time tradeoffs.

fixed space overhead: One can bound the size of the tape and the number of snapshots to ob-tain sublinear but superlogarithmic overhead in asymptotic time complexity compared with the primal.

fixed time overhead: One can bound the size of the tape and the (re)computation of the pri-mal to obtain sublinear but superlogarithmic overhead in asymptotic space complexity compared with the primal.

logarithmic space and time overhead: One can bound the size of the tape and obtain logarithmic overhead in both asymptotic space and time complexity compared with the primal. The constant factor is less than that of bisection checkpointing.

The strategies for selecting actual split points from candidate split points and the associated termination criteria are discussed further hereinbelow.

Divide-and-conquer checkpointing has only been provided in prior art AD systems in special cases. For example. Tapenade allows the user to select invocations of a specified DO loop as the root execution interval for divide-and-conquer checkpointing with the "c$ad binomial-ckp" pragma, taking iteration boundaries of that loop as candidate split points. Tapenade employs binomial selection of split points and a fixed space overhead termination criterion. Note, however, that Tapenade only guarantees this fixed space overhead property for DO loop bodies that take constant time. Similarly adol-c contains a nested taping mechanism for time-integration processes that also performs divide-and-conquer checkpointing. This only applies to code formulated as a time-integration process.

According to one embodiment, the present disclosure provides a system and method for applying divide-and-conquer checkpointing to arbitrary code with no special annotation or refactoring required. An entire specified derivative calculation is taken as the root execution interval, rather than invocations of a specified DO loop. Arbitrary execution points are taken as candidate split points, rather than iteration boundaries. As discussed below, both binary and n-ary (treeverse) checkpoint trees are supported. Furthermore, as discussed below, both bisection and binomial checkpointing are supported. Additionally, all of the above termination criteria are supported: fixed space overhead, fixed time overhead, and logarithmic space and time overhead. Any combination of the above checkpoint-tree generation algorithms, split-point selection methods, and termination criteria are supported. In order to apply this framework, the system must be able to interrupt the primal computation at appropriate execution points, save the interrupted execution state as a capsule, and restart the computation from the capsules, sometimes repeatedly. This is accomplished by building divide-and-conquer checkpointing on top of a general-purpose mechanism for interrupting and resuming computation. This mechanism is orthogonal to AD. The present disclosure provides several example implementations of a framework referred to as "checkpointVLAD."

Note that one cannot generally achieve the space and time guarantees of divide-and-conquer checkpointing with program-interval, subroutine-call-site, or subroutine-body checkpointing unless the call tree has the same shape as the requisite checkpoint tree. Furthermore, one cannot generally achieve the space and time guarantees of divide-and-conquer checkpointing for DO loops by specifying the loop body as a program-interval checkpoint because such would lead to a right-branching checkpoint tree and behavior analogous to FIG. 2(d). Moreover, if one allows split points at arbitrary execution points, the resulting checkpoint execution intervals may not correspond to program intervals.

Some form of divide-and-conquer checkpointing is necessary. One may wish to take the gradient of a long-running computation, even if it has low asymptotic time complexity. The length of the tape required by reverse mode without divide-and-conquer checkpointing increases with increasing run time. Modern computers can execute several billion floating point operations per second, even without GPUs and multiple cores, which only exacerbate the problem. If each such operation required storage of a single eight-byte double precision number, modern terabyte RAM sizes would fill up after a few seconds of computation. Thus without some form of divide-and-conquer checkpointing, it would not be possible to efficiently take the gradient of a computation that takes more than a few seconds.

There are limitations to the divide-and-conquer checkpointing with split points at fixed syntactic program points like loop iteration boundaries. Consider the example in Table 1 below. This example, y=ƒ(x), while contrived, is a simple caricature of a situation that arises commonly in practice, e.g., in adaptive grid methods. Here, the duration of the inner loop varies wildly as some function l(x, i) of the input and the outer loop index, perhaps 2 lg(n)−lg(1+(1007 3 i mod n)), that is small on most iterations of the outer loop but O(n) on a few iterations. If the split points were limited to iteration boundaries of the outer loop, as would be common in existing implementations, the increase in space or time requirements would grow larger than sublinearly. The issue is that for the desired sublinear growth properties to hold, it must be possible to select arbitrary execution points as split points. In other words, the granularity of the divide-and-conquer decomposition must be primitive atomic computations, not loop iterations. The distribution of run time across the program is not modularly reflected in the static syntactic structure of the source code, in this case the loop structure. Often, the user is unaware of or even unconcerned with the micro-level structure of atomic computations and does not wish to break the modularity of the source code to expose such. Yet the user may still wish to reap the sublinear space or time overhead benefits of divide-and-conquer checkpointing. Moreover, the relative duration of different paths through a program may vary from loop iteration to loop iteration in a fashion that is data dependent, as shown by the above example, and not even statically determinable.

TABLE 1

```
function ilog2(n)
  ilog2 = dlog(real(n, 8))/dlog(2.0d0)
end
subroutine f(n, x, y)
  y = x
c$ad binomial-ckp n+1 30 1
  do 1 = 1, n
    m = 2**(ilog2(n)−
+          ilog2(1+int(mod(real(x, 8)**3*real(i, 8)*
+                                            1007.0d0,
+                           real(n, 8)))))
    do j = 1, m
      y = y*y
      y = sqrt(y)
    end do
  end do
end
program main
  read *, n
  read *, x
  read *, yb
  call f(n, x, y)
  call f_b (n, x, xb, y, yb)
  print *, y
  print *, xb
end
```

The present disclosure provides a system and method for divide-and-conquer checkpointing that does not constrain split points to loop iteration boundaries or other syntactic program constructs and does not constrain checkpoints to program intervals or other syntactic program constructs. In certain embodiments, the system implements a computer instruction language, referred to as checkpointVLAD.

The instruction language checkpointVLAD adds builtin AD operators to a functional pre-AD core language. The following constructs are provided:

$$e::=c|x|\lambda x.e|e_1 e_2|\text{if } e_1 \text{ then } e_2 \text{ else } e_3|\diamond e|e_1 \bullet e_2 \qquad (1)$$

where e denotes expressions, c denotes constants, x denotes variables, $e_1$ $e_2$ denotes function application. $\diamond$ denotes builtin unary operators, and • denotes builtin binary operators. For expository simplicity, the discussion of the core language here omits many vagaries such as support for recursion and functions of multiple arguments; the actual implementation supports these using standard mechanisms that are well known within the programming-language community (e.g., tupling or Currying).

Direct-Style Evaluator for the Core Language: In one embodiment, the system provides a simple evaluator for this core language (see FIG. 3) and extend such to perform AD and ultimately divide-and-conquer checkpointing. This evaluator is written in what is known in the programming-language community as direct style, where functions (in this case ε, denoting 'eval' and A, denoting 'apply') take inputs as function-call arguments and yield outputs as function-call return values. While this evaluator can be viewed as an interpreter, it is intended more as a description of the evaluation mechanism; this mechanism could be the underlying hardware as exposed via a compiler.

With any evaluator, one distinguishes between two language evaluation strata: the target, the language being implemented and the process of evaluating programs in that language, and the host, the language in which the evaluator is written and the process of evaluating the evaluator itself. In our case, the target is checkpointVLAD, while the host varies among our three implementations; for the first two it is SCHEME while for the third it is the underlying hardware, achieved by compilation to machine code via C. In the evaluator in FIG. 3, ρ denotes an environment, a mapping from variables to their values, $\rho_0$ denotes the empty environment that does not map any variables, ρx denotes looking up the variable x in the environment ρ to obtain its value, ρ[x (v] denotes augmenting an environment ρ to map the variable x to the value v, and ερe denotes evaluating the expression e in the context of the environment ρ. There is a clause for ε in FIG. 3. (3) to (9), for each construct in (1). Clause (3) says that one evaluates a constant by returning that constant. Clause (4) says that one evaluates a variable by returning its value in the environment. The notation ⟨e, ρ⟩ denotes a closure, a lambda expression e together with an environment ρ containing values for the free variables in e. Clause (5) says that one evaluates a lambda expression by returning a closure with the environment in the context that the lambda expression was evaluated in. Clause (6) says that one evaluates an application by evaluating the callee expression to obtain a closure, evaluating the argument expression to obtain a value, and then applying the closure to the value with A. A, as described in (2), evaluates the body of the lambda expression in the callee closure in the environment of that closure augmented with the formal parameter of that lambda expression bound to the argument value. The remaining clauses are all analogous to clause (9), which says that one evaluates an expression $e_1 \bullet e_2$ in the target by evaluating $e_1$ and $e_2$ to obtain values and then applying • in the host to these values.

Adding AD Operators to the Core Language: Unlike many AD systems implemented as libraries, the presently disclosed system provides support for AD by augmenting the core language to include builtin AD operators for both forward and reverse mode. This allows seamless integration of AD into the language in a completely general fashion with no unimplemented or erroneous corner cases. In particular, it allows nesting. In checkpointVLAD, we adopt slight variants of the $\vec{\mathcal{J}}$ and $\overleftarrow{\mathcal{J}}$ operators previously incorporated into VLAD. (Nothing turns on this. The variants adopted here are simpler, better suit our expository purposes, and allow us to focus on the issue at hand.) In checkpointVLAD, these operators have the following signatures:

$$\vec{\mathcal{J}}{:}f x \dot{x} \;{\vdash}{\to}\;(y, \dot{y}) \quad \overleftarrow{\mathcal{J}}{:}f x \dot{y} \;{\vdash}{\to}\;(y, \dot{x})$$

We use the notation $\dot{x}$ and $\grave{x}$ to denote tangent or cotangent values associated with the primal value x respectively, and the notation (x, y) to denote a pair of values. Since in checkpointVLAD, functions can take multiple arguments but only return a single result, which can be an aggregate like a pair, the AD operators take the primal and the associated (co)tangent as distinct arguments but return the primal and the associated (co)tangent as a pair of values.

The $\vec{\mathcal{J}}$ operator provides the portal to forward mode and calls a function $f$ on a primal x with a tangent $\dot{x}$ to yield a primal y and a tangent $\dot{y}$. The $\overleftarrow{\mathcal{J}}$ operator provides the portal to reverse mode and calls a function $f$ on a primal x with a cotangent $\grave{y}$ to yield a primal y and a cotangent $\grave{x}$. Unlike the original VLAD, here, we restrict ourselves to the case where (co)tangents are ground data values, i.e., reals and (arbitrary) data structures containing reals and other scalar values, but not functions (i.e., closures). Nothing turns on this; it allows us to focus on the issue at hand.

The implementations of VLad and checkpointVLAD are disjoint and use completely different technology. The STALIN ∇ implementation of VLAD is based on source-code transformation, conceptually applied reflectively at run time but migrated to compile time through partial evaluation. The implementation of checkpointVLAD uses something more akin to operator overloading. Again, nothing turns on this; this simplification is for expository purposes and allows us to focus on the issue at hand. In checkpointVLAD, AD is performed by overloading the arithmetic operations in the host, in a fashion similar to FADBAD++. The actual method used is that employed by R6RS-AD and DiffSharp. The key difference is that FADBAD++ uses C++ templates to encode a hierarchy of distinct forward-mode types (e.g., F<double>, F<F<double>>, . . . ), distinct reverse-mode types (e.g., B<double>, B<B<double>>, . . . ), and mixtures thereof (e.g., F<B<double>>, B<F<double>>, . . . ) while here, the system uses a dynamic, run-time approach where numeric values are tagged with the nesting level. Template instantiation at compile-time specializes code to different nesting levels. The dynamic approach allows a single interpreter (host), formulated around unspecialized code, to interpret different target programs with different nesting levels.

Augmenting the Direct-Style Evaluator to Support the AD Operators: We add AD into the target language as new constructs:

$$e::= \vec{\mathcal{J}} e_1 e_2 e_3 \mid \overleftarrow{\mathcal{J}} e_1 e_2 e_3 \tag{10}$$

We implement this functionality by augmenting the direct-style evaluator with new clauses for ε (FIG. 4), clause (13) for $\vec{\mathcal{J}}$ and clause (14) for $\overleftarrow{\mathcal{J}}$. These clauses are all analogous to clause (9), formulated around $\vec{\mathcal{J}}$ and $\overleftarrow{\mathcal{J}}$ operators in the host. These ae defined in (11) and (12). The $\vec{\mathcal{J}}$ and $\overleftarrow{\mathcal{J}}$ operators in the host behave like A except that they level shift to perform AD. Just like (Afx) applies a target function $f$ (closure) to a target value x, $\vec{\mathcal{J}}fx\dot{x}$) performs forward mode by applying a target function $f$ (closure) to a target primal value x and a target tangent value $\dot{x}$, while $\overleftarrow{\mathcal{J}}fx\grave{y}$) performs reverse mode by applying a target function $f$ (closure) to a target primal value x and a target cotangent value $\grave{y}$.

As described in (11), $\vec{\mathcal{J}}$ operates by recursively walking $v_2$, a data structure containing primals, in tandem with $\dot{v}_3$, a data structure containing tangents, to yield a single data structure where each numeric leaf value is a dual number, a numeric primal value associated with a numeric tangent value. This recursive walk is denoted as $v_2 \triangleright \dot{v}3$. A is then used to apply the function (closure) $v_1$ to the data structure produced by v2 $\triangleright \dot{v}3$. Since the input argument is level shifted and contains dual numbers instead of ordinary reals, the underlying arithmetic operators invoked during the application perform for-ward mode by dispatching on the tags at run time. The call to A yields a result data structure where each numeric leaf value is a dual number. This is then recursively walked to separate out two data structures, one, $v_4$, containing the numeric primal result values, and the other, $\dot{v}_5$, containing the numeric tangent result values, which are returned as a pair ($v_4$, $\dot{v}_5$) This recursive walk is denoted as let (v4 $\triangleright \dot{v}5$)= . . . in . . . .

As described in (12), $\overleftarrow{\mathcal{J}}$ operates by recursively walking $v_2$, a data structure containing primals, to replace each numeric value with a tape node. A is then used to apply the function (closure) $v_1$ to this modified $v_2$. Since the input argument is level shifted and contains tape nodes instead of ordinary reals, the underlying arithmetic operators invoked during the application perform the forward sweep of reverse mode by dispatching on the tags at run time. The call to A yields a result data structure where each numeric leaf value is a tape node. A recursive walk is performed on this result data structure, in tandem with a data structure $\grave{v}_3$ of associated cotangent values, to initiate the reverse sweep of reverse mode. This combined operation is denoted as ((A $v_1$ $v_2$) $\triangleleft \grave{v}_3$). The result of the forward sweep is then recursively walked to replace each tape node with its numeric primal value and the input value is recursively walked to replace each tape node with the cotangent computed by the reverse sweep. These are returned as a pair ($v_4$, $\grave{v}_5$). This combined operation is denoted as let ($v_4$ $\triangleright\grave{v}_5$)= . . . in . . . .

An Operator to Perform Divide-and-Conquer Checkpointing in Reverse-Mode AD: The system includes a new AD operator $\overleftarrow{\mathcal{G}}$ to perform divide-and-conquer checkpointing. The crucial aspect of the design is that the signature (and semantics) of $\overleftarrow{\mathcal{G}}$ is identical to $\overleftarrow{\mathcal{J}}$; they are completely interchangeable, differing only in the space/time complexity tradeoffs. This means that code need not be modified to switch back and forth between ordinary reverse mode and various forms of divide-and-conquer checkpointing, save interchanging calls to →J and $\overleftarrow{\mathcal{G}}$.

Conceptually, the behavior of $\overleftarrow{\mathcal{G}}$ is shown in FIG. 5. In this inductive definition, a function $f$ is split into the composition of two functions g and h in step (1), the z is computed by applying g to the input x in step (2), and the cotangent is computed by recursively applying $\overleftarrow{\mathcal{G}}$ to h and g in steps 3 and 4. This divide-and-conquer behavior is terminated in a base case, when the function $f$ is small, at which point the cotangent is computed with $\overleftarrow{\mathcal{J}}$, in step (0). If step (1) splits a function $f$ into two functions g and h that take the same number of evaluation steps, and we terminated the recursion when $f$ f takes a bounded number of steps, the recursive divide-and-conquer process yields logarithmic asymptotic space/time overhead complexity.

The central difficulty in implementing the above is performing step (1), namely splitting a function $f$ into two functions g and h, such that $f=h\circ g$, ideally where we can specify the split point, the number of evaluation steps through $f$ where g transitions into h. A sophisticated user can manually rewrite a subprogram f into two subprograms g and h. A sufficiently powerful compiler or source transformation tool might also be able to do so, with access to nonlocal program text. But an overloading system, with access only to local information, would not be able to.

General-Purpose Interruption and Resumption Mechanism: The presently disclosed system solves this problem by providing an interface to a general-purpose interruption and resumption mechanism that is orthogonal to AD (FIG. 6). This interface allows (a) deter-mining the number of evaluation steps of a computation, (b) interrupting a computation after a specified number of steps, usually half the number of steps determined by the mechanism in (a), and (c) resuming an interrupted computation to completion. A variety of implementation strategies for this interface are possible.

Irrespective of how one implements the general-purpose interruption and resumption interface, one can use it to implement the binary bisection variant $\tilde{\jmath}$ in the host, as shown in FIG. 7. The function $f$ is split into the composition of two functions g and h by taking g as ($\lambda$x.interrupt $f$xl), where l is half the number of steps determined by (primops $f$x), and h as ($\lambda$z.resume z).

Continuation-Passing-Style Evaluator: One way of implementing the general-purpose interruption and resumption interface is to convert the evaluator from direct style to what is known in the programming-language art as continuation-passing style (CPS), where functions (in this case $\varepsilon$, A, $\tilde{\jmath}$, $\tilde{\jmath}$ in the host) take an additional continuation input k and instead of yielding outputs via function-call return, do so by calling the continuation with said output as arguments (FIGS. 8 and 9). In such a style, functions never return; they just call their continuation. With tail-call merging, this corresponds to a computed go to and does not incur stack growth. This crucially allows an interruption to actually return a capsule containing the saved state of the evaluator, including its continuation, allowing the evaluation to be resumed by calling the evaluator with this saved state. This 'level shift' of return to calling a continuation, allowing an actual return to constitute interruption, is analogous to the way backtracking is classically implemented in Prolog, with success implemented as calling a continuation and failure implemented as actual return. In our case, we further instrument the evaluator to thread two values as inputs and outputs: the count n of the number of evaluation steps, which is incremented at each call to $\varepsilon$, and the limit l of the number of steps, after which an interrupt is triggered.

FIG. 8 contains the portion of the CPS evaluator for the core language corresponding to FIG. 3, while FIG. 9 contains the portion of the CPS evaluator for the AD constructs corresponding to FIG. 4. Except for (16), the equations in FIGS. 3 and 4 are in one-to-one correspondence to those in FIGS. 8 and 9, in order. Clauses (17)-(19) are analogous to the corresponding clauses (3)-(5) except that they call the continuation k with the result, instead of returning that result. The remaining clauses for $\varepsilon$ in the CPS evaluator are all variants of $$\varepsilon(\lambda n l\ v_1.$$ (28)
$$(\varepsilon(\lambda n l\ v_2,$$
$$(k n l\ ...\ )$$
$$n l p e_2))$$
$$(n+1) l \rho e_1$$

for one-, two-, or three-argument constructs. This evaluates the first argument $e_1$ and calls the continuation ($\lambda$nlv$_1$ ... ) with its value v1. This continuation then evaluates the second argument e2 and calls the continuation ($\lambda$nlv$_2$ ... ) with its value v$_2$. This continuation computes something, denoted by ... , and calls the continuation k with the resulting value.

The CPS evaluator threads a step count n and a step limit l through the evaluation process. Each clause of E increments the step count exactly once to provide a coherent fine-grained measurement of the execution time. Clause (16) of E implements interruption. When the step count reaches the step limit, a capsule containing the saved state of the evaluator, denoted [[k, $f$]], is returned. Here, $f$ is a closure $\langle\lambda$.e, $\rho\rangle$ containing the environment $\rho$ and the expression e at the time of interruption. This closure takes an argument that is not used. The step count n must equal the step limit l at the time of interruption. As will be discussed below, neither the step count nor the step limit need to be saved in the capsule, as the computation is always resumed with different step count and limit values.

Several things about this CPS evaluator are of note. First, all builtin unary and binary operators are assumed to take unit time. This follows from the fact that all clauses for $\varepsilon$, as typified by (28), increment the step count by one. Second, the builtin unary and binary operators in the host are implemented in direct style and are not passed a continuation. This means that clauses (22) and (23), as typified by (28), must call the continuation k on the result of the unary and binary operators. Third, like all builtin operators, invocations of the $\tilde{\jmath}$ and $\tilde{\jmath}$ operators, including the application of v$_1$, are assumed to take unit time. This follows from the fact that clauses (26) and (27), again as typified by (28), increment the step count by one. Fourth, like all builtin operators, $\tilde{\jmath}$ and $\tilde{\jmath}$ in the host, in (24) and (25), are implemented in direct style and are not passed a continuation. This means that clauses (26) and (27), as typified by (28), must call the continuation k on the result of $\tilde{\jmath}$ and $\tilde{\jmath}$. Finally, since $\tilde{\jmath}$ and $\tilde{\jmath}$ receive target functions (closures) for v$_1$, they must apply these to their arguments with A. Since A is written in CPS in the CPS evaluator, these calls to A in (24) and (25) must be provided with a continuation k, a step count n, and a step limit l as arguments. The continuation argument simply returns the result. The step count, however, is restarted at zero, and the step limit is set to $\infty$. This means that invocations of $\tilde{\jmath}$ and $\tilde{\jmath}$ are atomic and cannot be interrupted internally.

Implementing the General-Purpose Interruption and Resumption Interface with the CPS Evaluator: With this CPS evaluator, it is possible to implement the general-purpose interruption and resumption interface (FIG. 10). The implementation of PRIMOPS (29) calls the evaluator with no step limit and simply counts the number of steps to completion. The implementation of INTERRUPT (30) calls the evaluator with a step limit that must be smaller than that needed to complete so an interrupt is forced and the capsule [[k, (($\lambda$ ... e), $\rho$)]] is returned. The implementation of RESUME (31) calls the evaluator with arguments from the saved capsule. Since the closure in the capsule does not use its argument, an arbitrary value $\perp$ is passed as that argument.

Note that calls to A in $\tilde{\jmath}$ (24), $\tilde{\jmath}$(25), PRIMOPS (29), INTERRUPT (30), and RESUME (31) are the only portals into the CPS evaluator. The only additional call to A is in the evaluator itself, clause (20) of $\varepsilon$. All of the portals restart the step count at zero. Except for the call in INTERRUPT (30), none of the portals call the evaluator with a step limit. In particular, RESUME (31) does not provide a step limit; other mechanisms detailed below provide for interrupting a resumed capsule.

This implementation of the general-purpose interruption and resumption interface cannot be used to fully implement $\mathcal{J}$ in the host as depicted in FIG. 7. The reason is that the calls to $\mathcal{J}$ in the base case, step (0), and INTERRUPT in step (2), must take a target function (closure) for $f$, because such is what is invoked by the calls to A in $\mathcal{J}$ (25) and INTERRUPT (30). As written in FIG. 7, the recursive calls to $\mathcal{J}$, namely steps (3) and (4), pass ($\lambda$z.resume z) and ($\lambda$x.interrupt $f$x[l/2]) for $f$. There are two problems with this. First, these are host closures produced by host lambda expressions, not target closures. Second, these call the host functions resume and interrupt that are not available in the target. Thus it is not possible to formulate these as target closures without additional machinery.

Examination of FIG. 7 reveals that the general-purpose interruption and resumption interface is invoked four times in the implementation of $\mathcal{J}$. PRIMOPS is invoked in step (1), INTERRUPT is invoked in steps (2) and (4), and RESUME is invoked in step (3). Of these, PRIMOPS is invoked only in the host, RESUME is invoked only in the target, and INTERRUPT is invoked in both the host and the target. Thus we need to expose interrupt and resume to the target. We do not need to expose PRIMOPS to the target; the implementation in FIG. 7 only uses it in the host. For interrupt, the call in step (2) can use the host implementation (30) in FIG. 10 but the call in step (4) must use a new variant exposed to the target. For resume, the call in step (3) must also use a new variant exposed to the target. The host implementation (31) in FIG. 10 is never used since RESUME is never invoked in the host.

We expose INTERRUPT and RESUME to the target by adding them to the target language as new constructs:

$$e::=\text{interrupt} e_1 e_2 e_3 | \text{resume} \, e \quad (32)$$

We implement this functionality by augmenting the CPS evaluator with new clauses for $\varepsilon$ (FIG. 11), clause (35) for interrupt and clause (36) for resume. We discuss the implementation of these below. But we first address several other issues.

With appropriate implementations of interrupt and resume expressions in the target language, one can create target closures for the expressions ($\lambda$z.resume z) and ($\lambda$x.interrupt $f$x[l/2]), and use these to formulate a proper implementation of $\mathcal{J}$ in the host. We formulate a target closure to correspond to ($\lambda$z.resume z) and denote this as R. The definition is given in (34) in FIG. 11. Note that since ($\lambda$z.resume z) does not contain any free variables, the closure created by R is constructed from the empty environment $\rho_0$. Thus there is a single constant R. We similarly formulate a target closure to correspond to ($\lambda$x.interrupt $f$xl) and denote this as I. The definition is given in (33) in FIG. 11. Here, however, ($\lambda$x.interrupt $f$xl) contains two free variables: $f$ and l. Thus the closure created by I contains a nonempty environment with values for these two variables. To provide these values, I is formulated as a function that takes these values as arguments.

With (I$f$l) and R, it is now possible to reformulate the definition of $\mathcal{J}$ in the host from FIG. 7, replacing the host closure ($\lambda$z.RESUME z) in step (3) with the target closure R and the host closure ($\lambda$x.INTERRUPT $f$x[l/2]) in step (4) with the target closure (I$f$[l/2]). This new, proper definition of $\mathcal{J}$ in the host is given in FIG. 12.

In this proper implementation of $\mathcal{J}$ in the host, the interrupt and resume operations need to be able to nest, even without nesting of calls to $\mathcal{J}$ in the target. The recursive calls to $\mathcal{J}$ in the inductive case of FIG. 12 imply that it must be possible to interrupt a resumed capsule. This happens when passing R for f in step (3) and then passing (I f . . . ) for f in step (4), i.e., the left branch of a right branch in the checkpoint tree. The resulting function $f$=(I R . . . ) will interrupt when applied to some capsule. It also happens when passing (I $f$ . . . ) for $f$ twice in succession in step (4), i.e., the left branch of a left branch in the checkpoint tree. The resulting function $f$=(I(I $f$ . . . ) . . . ) will interrupt and the capsule produced will interrupt when resumed.

Consider all the ways that evaluations of interrupt and resume expressions can nest. User code will never contain interrupt and resume expressions; they are created only by invocations of I and R. R is only invoked by step (3) of $\mathcal{J}$ in FIG. 12. I is invoked two ways: step (4) of $\mathcal{J}$ in FIG. 12 and a way that we have not yet encountered, evaluation of nested interrupt expressions in the else branch of clause (35) in FIG. 11. Consider all the ways that evaluations of I and R can be invoked in $\mathcal{J}$ in FIG. 12. $\mathcal{J}$ is invoked with some user code for $f$, i.e., code that does not contain interrupt and resume expressions. The inductive cases for $\mathcal{J}$ create a binary checkpoint tree of invocations. The leaf nodes of this binary checkpoint tree correspond to the base case in step (0) where the host $\overline{\mathcal{J}}$ is invoked. At internal nodes, the host INTERRUPT is invoked in step (2). The target closure values that can be passed to the host $\overline{\mathcal{J}}$ and INTERRUPT are constructed from $f$, I, and R in steps (3) and (4). What is the space of all possible constructed target closures? The constructed target closures invoked along the left spine of the binary checkpoint tree look like the following:

$$(\mathcal{I}(\mathcal{I} \ldots (\mathcal{I}(\mathcal{I}fl_0)l_1) \ldots l_{i-1})l_i) \quad (37)$$

with zero or more nested calls to I. In this case $l_i<l_{i-1}< \ldots <l_1<l_0$, because the recursive calls to $\mathcal{J}$ in step (4) of FIG. 12 always reduce l. The constructed target closures invoked in any other node in the binary checkpoint tree look like the following:

$$(\mathcal{I}(\mathcal{I} \ldots (\mathcal{I}(\mathcal{I} \mathcal{R} l_0)l_1) \ldots l_{i-1})l_i) \quad (38)$$

with zero or more nested calls to I. In this case, again, $l_i<l_{i-1}< \ldots <l_1<l_0$, for the same reason. These are the possible target closures $f$ passed to $\overline{\mathcal{J}}$ in step (0) or INTERRUPT in step (2) of $\mathcal{J}$ in FIG. 12 (it is assumed that the call to PRIMOPS in step (1) is hoisted out of the recursion).

A string of calls to I as in (37) will result in a nested closure structure whose invocation will lead to nested invocations of interrupt expressions:

$$((\lambda x,(\text{interrupt f x l})),$$
$$\rho_0[f \mapsto ((\lambda x,(\text{interrupt f x l})),$$
$$\rho_0[f \mapsto (\ldots$$
$$(\lambda x,(\text{interrupt f x l})),$$
$$\rho_0[f \mapsto ((\lambda x,(\text{interrupt f x l})),$$
$$\rho_0[f \mapsto f]$$
$$[l \mapsto l_0])\,]$$
$$[l \mapsto l_1]\ldots)\,]$$
$$[l \mapsto l_{i-1}])\,]$$
$$[l \mapsto l_i]) \quad (39)$$

A string of calls to I as in (38) will also result in a nested closure structure whose invocation will lead to nested invocations of interrupt expressions.

$$((\lambda x, (\text{interrupt } f \times l)),$$
$$\rho_0[f \mapsto ((\lambda x, (\text{interrupt } f \times l)),$$
$$\rho_0[f \mapsto (...$$
$$(\lambda x, (\text{interrupt } f \times l)),$$
$$\rho_0[f \mapsto ((\lambda x, (\text{interrupt } f \times l)),$$
$$\rho_0[f \mapsto ((\lambda z, (\text{resume } z)), \rho_0)]$$
$$[l \mapsto l_0]) ]$$
$$[l \mapsto l_1]...)]$$
$$[l \mapsto l_{i-1}])]$$
$$[l \mapsto l_i) \quad (40)$$

In both of these, $l_i < l_{i-1} < < l_1 < l_0$, so the outermost interrupt expression will interrupt first. Since the CPS evaluator only maintains a single step limit, $l_i$ will be that step limit during the execution of the innermost content of these nested closures, namely $f$ in (39) and $\langle (\lambda z.(\text{resume } z)), \rho_0 \rangle$ in (40). None of the other intervening interrupt expressions will enforce their step limits during this execution. Thus we need to arrange for the capsule created when the step limit $l_i$ is reached during the execution of $f$ or $\langle (\lambda z.(\text{resume } z)), \rho_0 \rangle$ to itself interrupt with the remaining step limits $l_{i-1}, \ldots, l_1, l_0$. This is done by rewrapping the closure in a capsule with interrupt expressions. The interruption of $f$ or $\langle (\lambda z.(\text{resume } z)). \rho_0 \rangle$ will produce a capsule that looks like the following:

$$[\![k, f]\!] \quad (41)$$

where the closure $f$ contains only user code, i.e., no interrupt or resume expressions. The $f$ in (41) is wrapped with calls to I to reintroduce the step limits $l_{i-1}, \ldots, l_1, l_0$ $$[\![k, (\mathcal{I} \ldots (\mathcal{I} (\mathcal{I} f l_0) l_2) \ldots l_{i-1})]\!] \quad (42)$$

Which will yield a capsule that looks like the following:

$$[k, ((\lambda x \cdot (\text{interrupt } f \times l)), \quad (43)$$
$$\rho_0[f \mapsto ( \ldots$$
$$(\lambda x \cdot (\text{interrupt } f \times l)),$$
$$\rho_0[f \mapsto ((\lambda x \cdot (\text{interrupt } f \times l)),$$
$$\rho_0[f \mapsto f]$$
$$[l \mapsto l_0])]$$
$$[l \mapsto l_1] \ldots )]$$
$$[l \mapsto l_{i-1}])]$$

which will interrupt upon resumption. Each such interruption will peel off one interrupt expression. Note that since the closure $f$ in a capsule (41) contains only user code, it will not contain a resume expression. Further, since the wrapping process (43) only introduces interrupt expressions via calls to I (42), and never introduces resume expressions, the closures in capsules, whether wrapped or not, will never contain resume expressions.

When there is no contextual step limit, i.e., when $l=\infty$, the interrupt expression must introduce v3, the step limit specified as the argument to the interrupt expression, as the step limit. This is handled by the then branch of clause (35) in FIG. 11. When there is a contextual step limit, i.e., when $l=\sim\infty$, the interrupt expression must wrap the returned capsule. This wrapping is handled by the else branch of clause (35) in FIG. 11. Since capsule resumption restarts the step count at zero, the wrapping that handles nested step limits is relativized to this restart by the $v_3-l$ in the else branch in clause (35).

Capsule resumption happens in one place, the call to A in clause (36) in FIG. 11 for a resume expression. Except for the contextual step limit l, this is the same as the call to A in the implementation of resume in (31) in FIG. 10. Said resumption is performed by applying the capsule closure $f$, a target closure, to $\bot$, since the lambda expression in the capsule closure ignores its argument. This call to A is passed the capsule continuation k' as its continuation. Unlike the implementation of resume in (31), the step limit l is that which is in effect for the execution of the resume expression. This is to allow capsule resumption to itself interrupt. Because capsules are resumed with a step count of zero and the step limit at the time of resumption, the step count and limit at the time of the interruption need not be saved in the capsule.

As a result of this, all interrupt expressions will appear in one of two places. The first is a preamble (39) or (40) wrapped around either a user function f by (37) or a $\bar{\jmath}$resume expression in R by (38), respectively. Such will always be invoked either by $\bar{\jmath}$ in the base case, step (0), or by interrupt in step (2), of FIG. 12. The second is a preamble (43) wrapped around the closure of a capsule by the else branch in clause (35) of FIG. 11. i.e., (42). Such will always be invoked during capsule resumption, i.e., clause (36) of FIG. 11. We assume that the step limits are such that an interruption never occurs during either of these preambles. This is enforced by ensuring that the termination criterion that triggers the base case, step (0), of FIG. 12 is sufficiently long so that the calls to A in $\bar{\jmath}$ in step (0) and interrupt in step (2) won't interrupt before completion of the preamble.

There is one further requirement to allow the CPS evaluator to support divide-and-conquer checkpointing. The base case use of $\bar{\jmath}$ in step (0) of FIG. 12 needs to be able to produce cotangents $\dot{z}$ of capsules z in step (3) and consume them in step (4). A capsule $[\![k, f]\!]$ is the saved state of the evaluator. The value $f$ is a target closure $\langle \lambda x.e \rangle, \rho \rangle$ which contains an environment with saved state. This state is visible to $\vec{\mathcal{J}}$. But the continuation k is a host continuation, which is opaque. Any evaluator variables that it closes over are not visible to $\vec{\mathcal{J}}$. Thus the implementation of host continuations in the CPS evaluator must employ a mechanism to expose such. When we replace the CPS evaluator with a direct-style evaluator applied to CPS-converted target code, described hereinbelow, this will no-longer be necessary since continuations will be represented as target closures which are visible to $\vec{\mathcal{J}}$.

Augmenting the CPS Evaluator to Support Divide-and-Conquer Checkpointing: The system is further configured to add the $\vec{\mathcal{J}}$ operator to the target language as a new construct:

$$e ::= \vec{\mathcal{J}} e_1 e_2 e_3 \quad (44)$$

This functionality is implemented by augmenting the CPS evaluator with a new clause (45) for $\varepsilon$ (shown in FIG. 13). With this addition, target programs can perform divide-and-conquer checkpointing simply by calling $\vec{\mathcal{J}}$ instead of $\vec{\mathcal{J}}$.

Note that it is not possible to add the $\vec{\mathcal{J}}$ operator to the direct-style evaluator because the implementation of binary bisection checkpointing is built on the general-purpose interruption and resumption interface which is, in turn, built on the CPS evaluator. Further descriptions below remove this limitations. Also note that since the implementation of binary bisection checkpointing is built on the general-purpose interruption and resumption interface which is, in turn, built on an elevator, it is only available for programs that are evaluated, i.e., for programs in the target, but not for programs in the hose. This limitation is also removed below.

The process in FIG. 12 corresponds to FIG. 2(b). The start of the computation of $f$ in FIG. 12 corresponds to u in FIG. 2(b). The computation state at u is x in FIG. 12. Collectively, the combination of $f$ and x in FIG. 12 comprises a snapshot, the gold line 1010 in FIG. 2(b). The end of the computation of $f$ in FIG. 12 corresponds to v in FIG. 2(b). The computation state at v is y in FIG. 12. Step (1) computes [l which corresponds to the split point p in FIG. 2(b). Step (2) corresponds to the green line 1000 in FIG. 2(b), i.e., running the primal without taping from the snapshot $f$ and x at u until the split point p which is [l/2]. The capsule z in FIG. 12 corresponds to the computation state at p in FIG. 2(b). Brown line 1014 and pink line 1012 in FIG. 2 denote capsules. If step (3) would incur the base case, step (0), in the recursive call, it would correspond to the right stage (pair of red 1002 and blue 1004 lines) in FIG. 2(b). If step (4) would incur the base case, step (0), in the recursive call, it would correspond to the left stage (pair of red 1002 and blue 1004 lines) in FIG. 2(b). Note that $f$ and x is used both in steps (2) and (4). Referring to this as a snapshot is meant to convey that the information must be saved across the execution of step (3). And it must be possible to apply $f$ to x twice, once in step (2) and once in step (4). In some implementations, such a snapshot involves saving mutable state that must be restored. In our formulation in a functional framework, we need not explicitly save and restore state; we simply apply a function twice. Nonetheless, the storage required for the snapshot is implicit in the extended lifetime of the values $f$ and x which extends from the entry into $\mathcal{T}$, over step (3), until step (4). Note that recursive calls to $\mathcal{T}$ in step (4) extend the life of a snapshot. These are denoted as the black tick marks 1016 on the left of the gold 1010 and pink 1012 lines. In the treeverse algorithm, the lifetime of one snapshot ends at a tick mark by a call to retrieve in one recursive call to treeverse in the while loop of the parent and the lifetime of a new snapshot begins by a call to snapshot in the next recursive call to treeverse in the while loop of the parent. But since the state retrieved and then immediately saved again as a new snapshot is the same, these adjacent snapshot execution intervals can conceptually be merged.

Also note that recursive calls to $\mathcal{T}$ in in step (3) pass R and a capsule z as the f and x of the recursive call. Thus capsules from one level of the recursion become snapshots at the next level, for all but the base case step (0). Pink lines 1012 in FIG. 2 denote values that are capsules at one level but snapshots at lower levels. Some, but not all, capsules are snapshots. Some, but not all, snapshots are capsules. Gold lines 1010 in FIG. 2 denote snapshots that are not capsules. Brown lines 1014 in FIG. 2 denote capsules that are not snapshots. Pink lines 1012 in FIG. 2 denote values that are both snapshots and capsules.

It is now easy to see that the recursive call tree of the algorithm in FIG. 12 is isomorphic to a binary checkpoint tree. The binary checkpoint tree on the left below corresponds to the call tree on the right produced by the algorithm in FIG. 12.

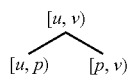

-continued $$z = \left( \text{INTERRUPT} f \, x \begin{bmatrix} 1 \\ 2 \end{bmatrix} \right)$$

$$(z, \dot{x}) = \left( {}'\!\mathcal{J}\!\left( \text{If} \begin{bmatrix} 1 \\ 2 \end{bmatrix} \right) x \dot{z} \right) \qquad (y, \dot{z}) = ({}'\!\mathcal{J} \, R \, z \, \dot{y})$$

The above depicts just one level of the recursion. If one unrolls the above call tree to a depth of three one obtains the binary checkpoint tree depicted in Appendix A).

CPS Conversion: So far, we have formulated divide-and-conquer checkpointing via a CPS evaluator. This can be—and has been-used to construct an interpreter. A compiler can be—and has been—constructed by generating target code in CPS that is instrumented with step counting, step limits, and limit checks that lead to interrupts. Code in direct style can be automatically converted to CPS using a program transformation known in the program-ming language community as CPS conversion. Many existing compilers, such as sml/nj for sml, perform CPS conversion as part of the compilation process.

We illustrate CPS conversion for the untyped lambda calculus (FIG. 14).

$$e ::= x \mid \lambda x \cdot e \mid e_1 e_2 \tag{46}$$

The notation $\langle e | k \rangle$ denotes the transformation of the expression e to CPS so that it calls the continuation k with the result. There is a clause for $\langle e | k \rangle$ in FIG. 14, (47) to (49), for each construct in (46). Clause (47) says that one converts a variable x by calling the continuation k with the value of that variable. Clause (48) says that one converts a lambda expression ($\lambda$x.e) by adding a continuation variable k' to the lambda binder, converting the body relative to that variable, and then calling the continuation k with that lambda expression. Clause (49) says that one converts an application ($e_1$ $e_2$) by converting $e_1$ with a continuation that receives the value $x_1$ of $e_1$, then converts $e_2$ with a continuation that receives the value $x_2$ of $e_2$, and then calls $x_1$ with the continuation k and $x_2$. Clause (50) says that the top level expression e0 can be converted with the identity function as the continuation.

This technique can be extended to thread a step count n and a step limit l through the computation along with the continuation k, and to arrange for the step count to be incremented appropriately. Further, this technique can be applied to the entire target language (FIG. 15). Clauses (51)-(60) correspond one-to-one to the checkpointVLAD constructs in (1), (10), and (44). Since CPS conversion is only applied once at the beginning of compilation, to the user program, and the user program does not contain interrupt and resume expressions, since these only appear internally in the target closures created by I and R. CPS conversion need not handle these constructs. Finally, teyk,n,l denotes a limit check that interrupts and returns a capsule when the step count n reaches the step limit l. The implementation of this limit check is given in (61). Each of the clauses (51)-(60) is wrapped in a limit check.

Augmenting the Direct-Style Evaluator to Support CPS-Converted Code and Divide-and-Conquer Checkpointing: The direct-style evaluator must be modified in several ways to support CPS-converted code and divide-and-conquer checkpointing (FIG. 16). First, CPS conversion introduced lambda expressions with multiple arguments and their corresponding applications. Con-tinuations have three arguments and converted lambda expressions have four. Thus we add several new constructs into the target language to replace the single argument lambda expressions and applications from (1).

$$e::=\lambda_3 nlxe | \lambda_4 knlxe | e_1 e_2 e_3 e_4 | e_1 e_2 e_3 e_4 e_5 \qquad (62)$$

Second, we need to modify ε to support these new constructs. We replace clause (2) with clauses (63) and (64) to update A and clauses (5) and (6) with clauses (65)-(68) to update ε. Third, we need to add support for interrupt and resume expressions, as is done with clauses (69) and (70). These are direct-style variants of clauses (35) and (36) from the CPS evaluator and are needed to add support for the general-purpose interruption and resumption interface to the direct-style evaluator when evaluating CPS code. Note that the calls to A from (35) and (36) are modified to use the converted form $A_4$ of A (64) in (69) and (70). Similarly, the calls to continuations from (35) and (36) are modified to use the continuation form $A_3$ of A (63) in (69) and (70). Fourth, the calls to $A_3$ must be modified in the host implementations of the AD operators $\vec{\mathcal{J}}$ and $\overleftarrow{\mathcal{J}}$, as is done with (71) and (72). Note that unlike the corresponding (11) and (12), the calls to $A_4$ here take target closures instead of host closures. Fifth, the general-purpose interruption and resumption interface, (29), (30), (33), and (34), must be migrated from the CPS evaluator to the direct-style evaluator as (73)-(76). In doing so, the calls to $A_4$ in primops and interrupt are changed to use (64), the host continuations are modified to be target continuations in (73) and (74), and the lambda expressions in (75) and (76) are CPS converted.

Compiling Direct-Style Code to C: One can compile target checkpointVLAD code, after CPS conversion, to C (FIGS. 17 and 18). Modern implementations of C, like GCC, together with modern memory management technology, like the Boehm-Demers-Weiser garbage collector, allow the compilation process to be a straightforward mapping of each construct to a small fragment of c code. In particular, garbage collection, GC_malloc, eases the implementation of closures and statement expressions. ({ . . . }), together with nested functions, ease the implementation of lambda expressions. Furthermore, the flow analysis, inlining, and tail-call merging performed by GCC generates reasonably efficient code. In FIGS. 17 and 18. S denotes such a mapping from checkpointVLAD expressions e to C code fragments. Instead of environments ρ, S takes π, a mapping from variables to indices in environment, the run-time environment data structure. Here, πx denotes the index of x, πi denotes the variable for index i, φe denotes a mapping for the free variables in e, and N denotes a mapping from a checkpointVLAD operator to the name of the C function that implements that operator. This, together with a library containing the typedef for thing, the enum for tag, definitions for null constant, true constant, false constant, cons, as closure, set closure, continuation apply, converted apply, is false, and all of the functions named by N (essentially a translation of r6rs-ad, the general-purpose interruption and resumption interface from FIG. 16, and the implementation of binary bisection checkpointing from FIG. 12 into C), allows arbitrary checkpointVLAD code to be compiled to machine code, via C, with complete support for AD, including forward mode, reverse mode, and binary bisection checkpointing.

Implementations: Three complete implementations of checkpointVLAD were created. All three accept exactly the same source language in its entirety and are able to run both examples discussed in Section 6 (Appendix A). The first implementation is an interpreter based on the CPS evaluator (FIGS. 8, 9, 11, and 13), where the evaluator, the operator overloading implementation of AD, the general-purpose interruption and resumption mechanism (FIG. 10), and the binary bisection checkpointing driver (FIG. 12) are implemented in Scheme. The second implementation is a hybrid compiler/interpreter that translates the checkpointVLAD source program into CPS using CPS conversion (FIG. 15) and then interprets this with an interpreter based on the direct-style evaluator (FIGS. 3, 4, and 16), where the compiler, the evaluator, the operator overloading implementation of AD, the general-purpose interruption and resumption mechanism (FIG. 16), and the binary bisection checkpointing driver (FIG. 12) are implemented in Scheme. The third implementation is a compiler that translates the checkpointVLAD source program into CPS using CPS conversion (FIG. 15) and then compiles this to machine code via c using GCC, where the compiler (FIGS. 17 and 18) is implemented in Scheme, the evaluator is the underlying hardware, and the operator overloading implementation of AD, the general-purpose interruption and resumption mechanism (FIG. 16), and the binary bisection checkpointing driver (FIG. 7) are implemented in C.

Figure 19:
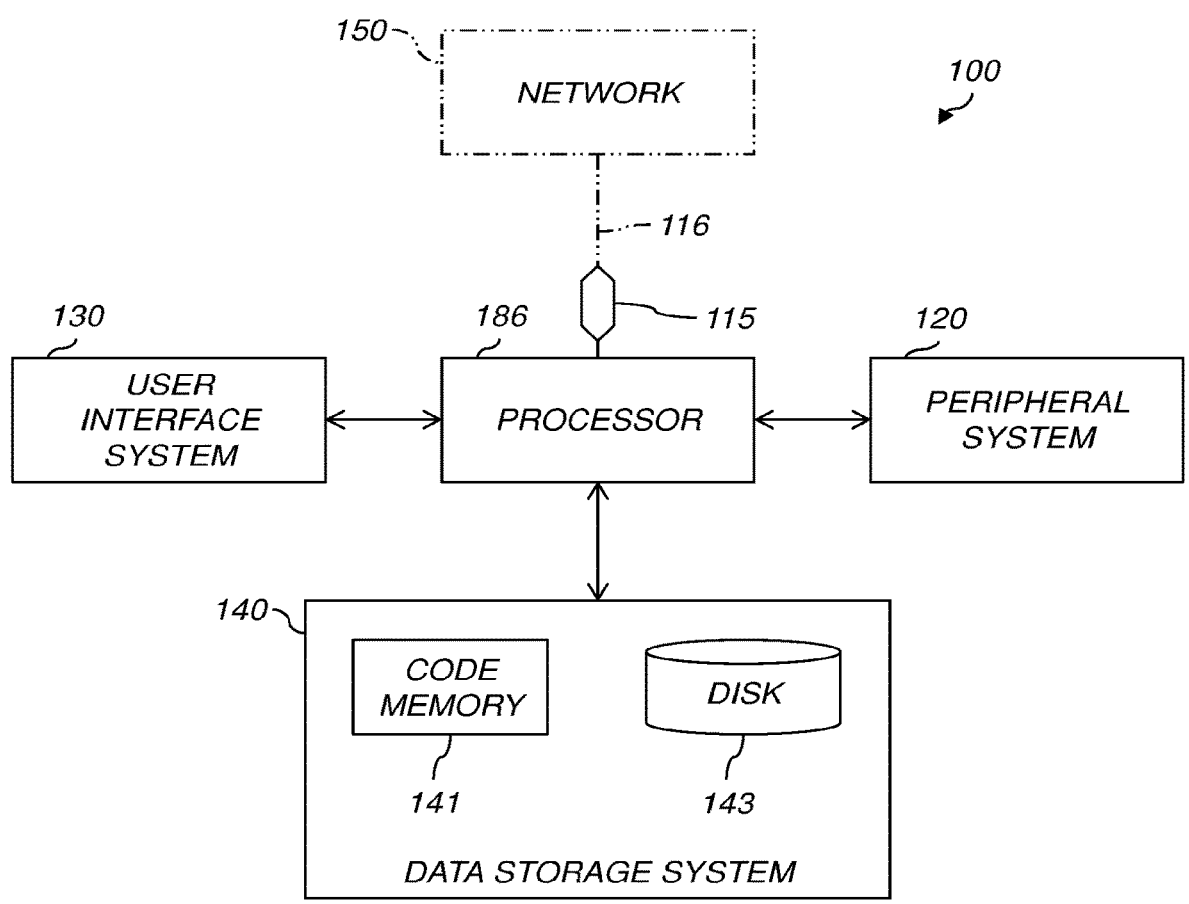
FIG. 19 is a diagram showing a data-processing system for sensing, processing and displaying data according to various aspects.

FIG. 19 is a high-level diagram showing the components of an exemplary data-processing system for analyzing data and performing other analyses described hereinabove, and related components. The system includes a processor 186, a peripheral system 120, a user interface system 130, and a data storage system 140. The peripheral system 120, the user interface system 130 and the data storage system 140 are communicatively connected to the processor 186. Processor 186 can be communicatively connected to network 150 (shown in phantom). e.g., the Internet or a leased line, as discussed below. It shall be understood that the system 100 may include multiple processors 186 and other components shown in FIG. 1. The input and output data described in the Papers may be obtained using network 150 (from one or more data sources), peripheral system 120 and/or displayed using display units (included in user interface system 130) which can each include one or more of systems 186, 120, 130, 140, and can each connect to one or more network(s) 150. Processor 186, and other processing devices described herein, can each include one or more microprocessors, microcontrollers, field-programmable gate arrays (FPGAs), application-specific integrated circuits (ASICs), programmable logic devices (PLDs), programmable logic arrays (PLAs), programmable array logic devices (PALs), or digital signal processors (DSPs).

Processor 186 can implement processes of various aspects described herein. Processor 186 can be or include one or more device(s) for automatically operating on data, e.g., a central processing unit (CPU), microcontroller (MCU), desktop computer, laptop computer, mainframe computer, personal digital assistant, digital camera, cellular phone, smartphone, or any other device for processing data, managing data, or handling data, whether implemented with electrical, magnetic, optical, biological components, or otherwise. Processor 186 can include Harvard-architecture components, modified-Harvard-architecture components, or Von-Neumann-architecture components.

The phrase "communicatively connected" includes any type of connection, wired or wireless, for communicating data between devices or processors. These devices or processors can be located in physical proximity or not. For example, subsystems such as peripheral system 120, user interface system 130, and data storage system 140 are shown separately from the data processing system 186 but can be stored completely or partially within the data processing system 186.

The peripheral system 120 can include one or more devices configured to provide information to the processor 186. The processor 186, upon receipt of information from a device in the peripheral system 120, can store such information in the data storage system 140.

The user interface system 130 can include a mouse, a keyboard, another computer (connected. e.g., via a network or a null-modem cable), or any device or combination of devices from which data is input to the processor 186. The user interface system 130 also can include a display device, a processor-accessible memory, or any device or combination of devices to which data is output by the processor 186. The user interface system 130 and the data storage system 140 can share a processor-accessible memory.

In various aspects, processor 186 includes or is connected to communication interface 115 that is coupled via network link 116 (shown in phantom) to network 150. For example, communication interface 115 can include an integrated services digital network (ISDN) terminal adapter or a modem to communicate data via a telephone line: a network interface to communicate data via a local-area network (LAN), e.g., an Ethernet LAN, or wide-area network (WAN); or a radio to communicate data via a wireless link, e.g., WiFi or GSM. Communication interface 115 sends and receives electrical, electromagnetic or optical signals that carry digital or analog data streams representing various types of information across network link 116 to network 150. Network link 116 can be connected to network 150 via a switch, gateway, hub, router, or other networking device.

Processor 186 can send messages and receive data, including program code, through network 150, network link 116 and communication interface 115. For example, a server can store requested code for an application program (e.g., a JAVA applet) on a tangible non-volatile computer-readable storage medium to which it is connected. The server can retrieve the code from the medium and transmit it through network 150 to communication interface 115. The received code can be executed by processor 186 as it is received, or stored in data storage system 140 for later execution.

Data storage system 140 can include or be communicatively connected with one or more processor-accessible memories configured to store information. The memories can be, e.g., within a chassis or as parts of a distributed system. The phrase "processor-accessible memory" is intended to include any data storage device to or from which processor 186 can transfer data (using appropriate components of peripheral system 120), whether volatile or non-volatile; removable or fixed; electronic, magnetic, optical, chemical, mechanical, or otherwise. Exemplary processor-accessible memories include but are not limited to: registers, floppy disks, hard disks, tapes, bar codes, Compact Discs, DVDs, read-only memories (ROM), erasable programmable read-only memories (EPROM, EEPROM, or Flash), and random-access memories (RAMs). One of the processor-accessible memories in the data storage system 140 can be a tangible non-transitory computer-readable storage medium, i.e., a non-transitory device or article of manufacture that participates in storing instructions that can be provided to processor 186 for execution.

In an example, data storage system 140 includes code memory 141, e.g., a RAM, and disk 143. e.g., a tangible computer-readable rotational storage device such as a hard drive. Computer program instructions are read into code memory 141 from disk 143. Processor 186 then executes one or more sequences of the computer program instructions loaded into code memory 141, as a result performing process steps described herein. In this way, processor 186 carries out a computer implemented process. For example, steps of methods described herein, blocks of the flowchart illustrations or block diagrams herein, and combinations of those, can be implemented by computer program instructions. Code memory 141 can also store data, or can store only code.

Additional disclosure is found in Appendix A, filed herewith, the entirety of which is incorporated herein by reference into the present disclosure.

Various aspects described herein may be embodied as systems or methods. Accordingly, various aspects herein may take the form of an entirely hardware aspect, an entirely software aspect (including firmware, resident software, micro-code, etc.), or an aspect combining software and hardware aspects These aspects can all generally be referred to herein as a "service," "circuit." "circuitry," "module." or "system."

Furthermore, various aspects herein may be embodied as computer program products including computer readable program code stored on a tangible non-transitory computer readable medium. Such a medium can be manufactured as is conventional for such articles, e.g., by pressing a CD-ROM. The program code includes computer program instructions that can be loaded into processor 186 (and possibly also other processors), to cause functions, acts, or operational steps of various aspects herein to be performed by the processor 186 (or other processor). Computer program code for carrying out operations for various aspects described herein may be written in any combination of one or more programming language(s), and can be loaded from disk 143 into code memory 141 for execution. The program code may execute, e.g., entirely on processor 186, partly on processor 186 and partly on a remote computer connected to network 150, or entirely on the remote computer.

The invention is inclusive of combinations of the aspects described herein. References to "a particular aspect" and the like refer to features that are present in at least one aspect of the invention. Separate references to "an aspect" (or "embodiment") or "particular aspects" or the like do not necessarily refer to the same aspect or aspects; however, such aspects are not mutually exclusive, unless so indicated or as are readily apparent to one of skill in the art. The use of singular or plural in referring to "method" or "methods" and the like is not limiting. The word "or" is used in this disclosure in a non-exclusive sense, unless otherwise explicitly noted.

The invention has been described in detail with particular reference to certain preferred aspects thereof, but it will be understood that variations, combinations, and modifications can be effected by a person of ordinary skill in the art within the spirit and scope of the invention.

The invention claimed is:

1. A method for computing the gradient of a function implemented as a computer program using a processor and a memory, comprising:
   a. representing a computation as a sequence of steps involving primitive computations;
   b. splitting the sequence in (a) either at its midpoint, or at a point selected to optimize the trade-off between computation and storage;
   c. computing the intermediate state of the computation at the point selected in (b), applying the portion of the computation prior to the point selected in (b);

d. recursively applying the method to the second portion of the computation beginning at the point selected in (b) to compute both the value of the entire computation and the gradient of the computation at the point selected in (b); and e. recursively applying the method to the first portion of the computation up to the point selected in (b) to compute the gradient of the computation at the input when the number of computational steps exceeds a minimum, otherwise using a standard method, including but not limited to automatic differentiation in its reverse-accumulation mode, to compute the gradient.

2. The method of claim 1 wherein the functionality is exposed to the user through an application programmer interface comprising an operator or higher-order function that takes a function and its argument as input and returns as output the value of the function at the input and the gradient of the function at the input.

3. The method of claim 2 wherein the operator or higher-order function is nested.

4. The method of claim 1, wherein the ability to divide a computation sequence into two portions is implemented via a general-purpose checkpointing mechanism, the general-purpose checkpointing mechanism comprising:

a. evaluating a function at its input and return both the value at its output and the number of steps required to compute the output:

b. evaluating the first specified number of steps of a computation of a function applied to an argument and return the intermediate state of the computation after that specified number of steps as a reusable checkpoint; and c. resuming a checkpointed computation at its saved intermediate state and return the result of its computation.

5. The method of claim 3 where the general-purpose checkpointing mechanism is provided by an interpreter written in continuation passing style.

6. The method of claim 3 where the general-purpose checkpointing mechanism is provided by a compiler that generates code in continuation passing style.

7. The method of claim 3 where the general-purpose checkpointing mechanism is provided using the POSIX fork() primitive.

8. The method of claim 1 where the checkpointing process proceeds without knowledge of the amount of computation in the primal computation, and functions in an online fashion, discarding previously acquired checkpoints so as to maintain the logarithmic overhead in both time and space regardless of when the primal computation terminates.

9. A method for applying an arbitrary adjoint computation to the reversal of the computation graph of an arbitrary computer program using a processor and a memory, comprising:

a. representing the computation as a sequence of steps involving primitive corn putations;

b. splitting the sequence in (a) at its midpoint, or at a point selected to optimize the trade off between computation and storage;

c. computing the intermediate state of the computation at the point selected in (b), applying the portion of the computation prior to the point selected in (b);

d. recursively applying the method to the second portion of the computation beginning at the point selected in (b) to compute both the value of the entire computation and the value of the adjoint computation at the point selected in (b);

e. recursively applying the method to the first portion of the computation up to the point selected in (b) to compute the value of the adjoint computation at the input when the number of computational steps exceeds a minimum.

10. The method of claim 9 where the functionality is exposed to the user through an application programmer interface consisting of an operator or higher-order function that takes a function and its argument as input and returns as output the value of the function and the value of the adjoint computation at the input.

11. The method of claim 10 where the operator or higher-order function is nested.

12. The method of claim 9 where the ability to divide a computation sequence into two portions is implemented via a general-purpose checkpointing mechanism, the general-purpose checkpointing mechanism comprising:

a. evaluating a function at its input and return both the value at its output and the number of steps required to compute the output:

b. evaluating the first specified number of steps of a computation of a function applied to an argument and return the intermediate state of the computation after that specified number of steps as a checkpoint; and c. resuming a checkpointed computation at its saved intermediate state and return the result of its computation.

13. The method of claim 12 where the general-purpose checkpointing mechanism is provided by an interpreter written in continuation passing style.

14. The method of claim 12 where the general-purpose checkpointing mechanism is provided by a compiler that generates code in continuation passing style.

15. The method of claim 12 where the general-purpose checkpointing mechanism is provided using the POSIX fork() primitive.

16. The method of claim 9 where the checkpointing process proceeds without knowledge of the amount of computation in the primal computation, and functions in an online fashion, discarding previously acquired checkpoints so as to maintain the logarithmic overhead in both time and space regardless of when the primal computation terminates.

17. A method of dividing a computation sequence into two portions that is implemented via a general-purpose checkpointing mechanism, comprising:

a. evaluating a function at its input and return both the value at its output and the number of steps required to compute the output;

b. evaluating the first specified number of steps of a computation of a function applied to an argument and return the intermediate state of the computation after that specified number of steps as a checkpoint; and c. resuming a checkpointed computation at its saved intermediate state and returning the result of its computation.

18. The method of claim 17, wherein the general-purpose checkpointing mechanism is provided by an interpreter written in continuation passing style.

19. The method of claim 17, wherein the general-purpose checkpointing mechanism is provided by a compiler that generates code in continuation passing style.

20. The method of claim 17, wherein the general-purpose checkpointing mechanism is provided using the POSIX fork() primitive.

* * * * *